(12) United States Patent
Furuya

(10) Patent No.: US 8,391,914 B2
(45) Date of Patent: Mar. 5, 2013

(54) TRANSMITTING APPARATUS, COMMUNICATION APPARATUS, RECEIVING APPARATUS, COMMUNICATION SYSTEM, BROADCAST RECEIVING SYSTEM, CONTROL PROGRAM, COMMUNICATION METHOD AND BROADCAST RECEIVING METHOD

(75) Inventor: Yukitsuna Furuya, Tokyo (JP)

(73) Assignee: NEC Corporation, Tokyo (JP)

( * ) Notice: Subject to any disclaimer, the term of this patent is extended or adjusted under 35 U.S.C. 154(b) by 846 days.

(21) Appl. No.: 12/300,360

(22) PCT Filed: May 1, 2007

(86) PCT No.: PCT/JP2007/059332
§ 371 (c)(1),
(2), (4) Date: Nov. 11, 2008

(87) PCT Pub. No.: WO2007/132675
PCT Pub. Date: Nov. 22, 2007

(65) Prior Publication Data
US 2009/0117844 A1 May 7, 2009

(30) Foreign Application Priority Data
May 11, 2006 (JP) .................................. 2006-132180

(51) Int. Cl.
H03D 3/00 (2006.01)
H04L 27/04 (2006.01)
H04M 1/00 (2006.01)
H04B 7/08 (2006.01)
H04B 1/06 (2006.01)

(52) U.S. Cl. .................. 455/550.1; 455/575.7; 455/132; 455/272; 375/322; 375/310

(58) Field of Classification Search .............. 455/550.1, 455/575.7, 132, 272; 375/322, 310
See application file for complete search history.

(56) References Cited

U.S. PATENT DOCUMENTS
5,926,752 A * 7/1999 Lin ................................ 455/323
(Continued)

FOREIGN PATENT DOCUMENTS
JP   1993168011 A   7/1993
JP   1999008607 A   1/1999
(Continued)

OTHER PUBLICATIONS
Japanese Office Action for JP2008-515488 issued Aug. 24, 2010.
(Continued)

*Primary Examiner* — Bobbak Safaipour

(57) ABSTRACT

There are obtained a transmitting apparatus capable of easily notifying information regarding radio waves required for an objective apparatus, a communication apparatus or a receiving apparatus capable of easily setting a frequency required at each place. a communication system or a broadcast receiving system employing the transmitting apparatus, the communication apparatus, and the receiving apparatus; and a control program, a communication method, and a broadcast receiving method to be used in the communication apparatus or the receiving apparatus. The radio wave tower 101 transmits not only radio waves for the television and the radio, but also the radio wave information 104 for communication and for reception of broadcasts by use of the radio wave information transmitting apparatus 102. For example, the portable terminal 106 first receives the radio wave information 104 in a new place and then obtains a center frequency based on the information for communication with the base station 110. This also applies to television and radio frequencies.

14 Claims, 12 Drawing Sheets

U.S. PATENT DOCUMENTS

| | | | |
|---|---|---|---|
| 6,272,071 B1* | 8/2001 | Takai et al. | 367/90 |
| 6,721,551 B2* | 4/2004 | Nagano et al. | 455/324 |
| 7,277,501 B2* | 10/2007 | Mori et al. | 375/322 |
| 8,023,459 B2* | 9/2011 | Kang et al. | 370/329 |
| 2002/0037702 A1* | 3/2002 | Nagano et al. | 455/76 |
| 2003/0128774 A1* | 7/2003 | Suzuki et al. | 375/316 |
| 2004/0174812 A1* | 9/2004 | Murakami et al. | 370/215 |
| 2005/0245298 A1* | 11/2005 | Mori | 455/575.7 |
| 2006/0023572 A1* | 2/2006 | Someya | 368/47 |
| 2007/0030918 A1* | 2/2007 | Kobayashi et al. | 375/267 |
| 2007/0110125 A1* | 5/2007 | Fujita et al. | 375/130 |
| 2008/0018548 A1* | 1/2008 | Maeda | 343/795 |
| 2008/0317098 A1* | 12/2008 | Juntunen | 375/130 |
| 2009/0129401 A1* | 5/2009 | Kang et al. | 370/431 |
| 2010/0202562 A1* | 8/2010 | Murakami et al. | 375/295 |
| 2011/0116388 A1* | 5/2011 | Murakami et al. | 370/248 |

FOREIGN PATENT DOCUMENTS

| | | |
|---|---|---|
| JP | 1999187325 A | 7/1999 |
| JP | 1999234227 A | 8/1999 |
| JP | 2000092541 A | 3/2000 |
| JP | 2002198922 A | 7/2002 |
| JP | 2002359825 A | 12/2002 |
| JP | 2004112504 A | 4/2004 |
| JP | 2004201117 A | 7/2004 |
| JP | 2006115404 A | 4/2006 |

OTHER PUBLICATIONS

International Search Report for PCT/JP2007/059332 mailed May 29, 2007.

* cited by examiner

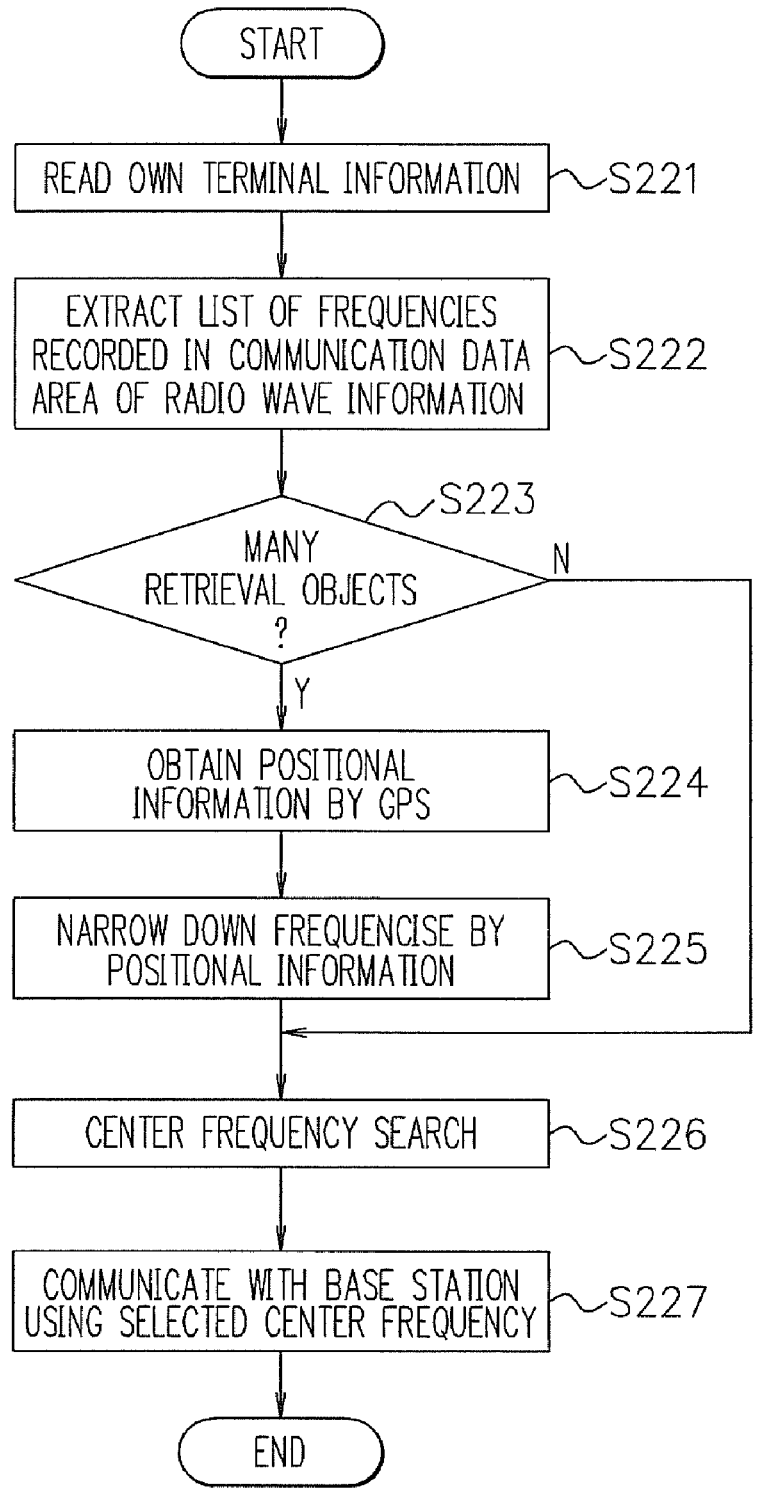
F I G. 7

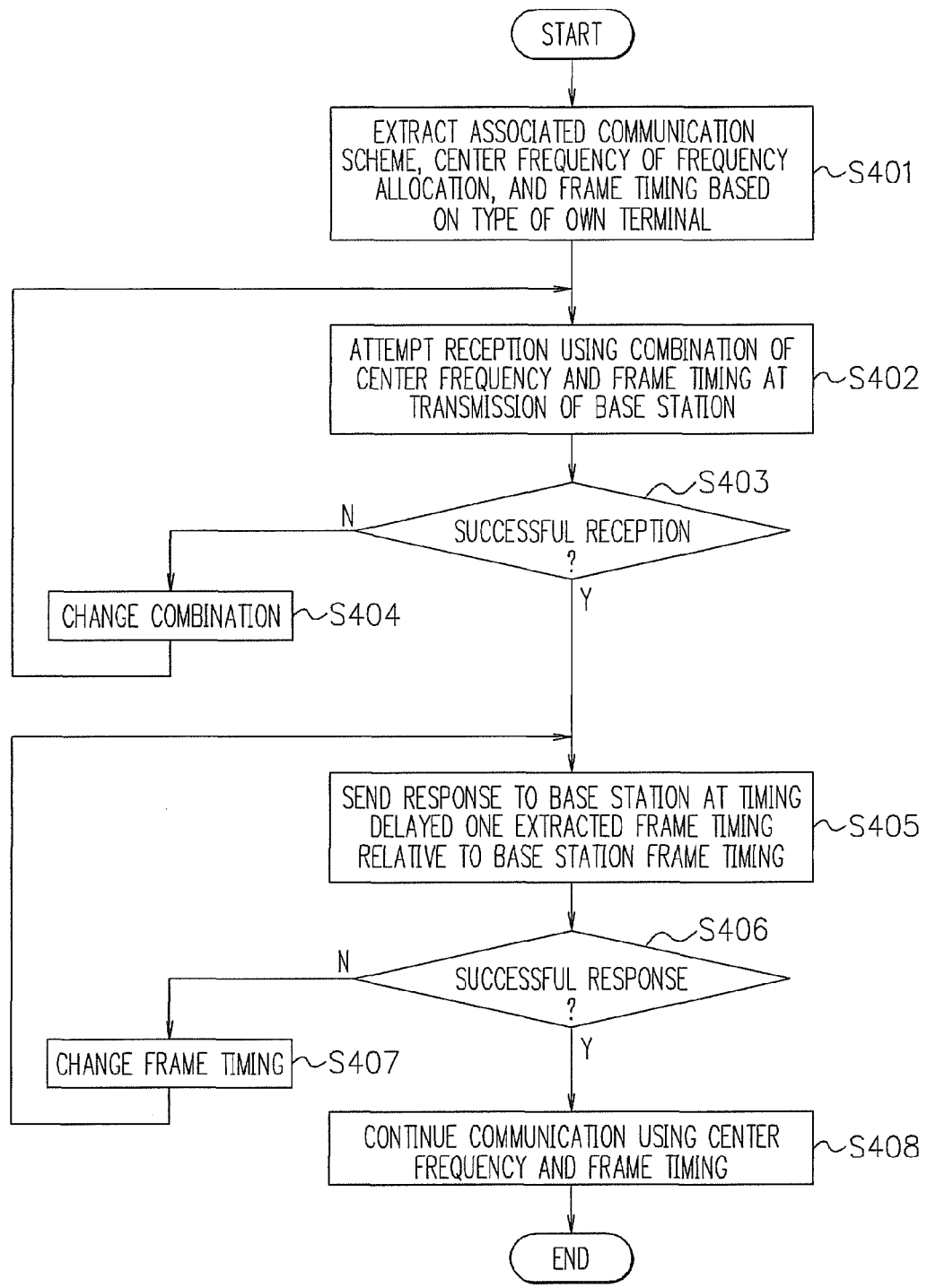

TRANSMITTING APPARATUS, COMMUNICATION APPARATUS, RECEIVING APPARATUS, COMMUNICATION SYSTEM, BROADCAST RECEIVING SYSTEM, CONTROL PROGRAM, COMMUNICATION METHOD AND BROADCAST RECEIVING METHOD

TECHNICAL FIELD

The present invention relates to a transmitting apparatus for transmitting information by a radio wave having a particular frequency, a communication apparatus and a receiving apparatus which use the information, a communication system or a broadcast receiving system which employs the transmitting apparatus, the communication apparatus, and the receiving apparatus; and a control program, a communication method, and a broadcast receiving method which are adopted by the communication apparatus or the receiving apparatus. Specifically, the present invention relates to communication apparatuses including, for example, a cellular, a Personal Handyphone System (HPS), a Personal Digital Assistant (PDA), a portable personal computer, and a personal computer and a navigation module which are arranged in mobile units such as a vehicle and a ship and which themselves do not move; transmission apparatuses including a radio wave tower which are appropriately adopted in receiving apparatuses for receiving a broadcast such as a TV set and a radio and which emit radio waves thereto, a communication system or a broadcast receiving system which adopts the transmitting apparatus, the communication apparatus, or the receiving apparatus; a control program to be used in the communication apparatus or the receiving apparatus, and a communication method and a broadcast receiving method which are adopted in these various apparatuses.

RELATED ART

There exist in the world various kinds of apparatuses including communication terminals conducting communication by radio such as a cellular, a Personal Handy-phone System (PHS), a Personal Digital Assistant (PDA), personal computers of portable type and those of other than the portable type, i.e., desktop type, and a navigation module as well as receiving apparatuses such as a television receiver and a radio receiver for receiving broadcasts. Naturally, there also exist apparatuses which conduct, like a portable terminal to receive television and radio broadcasts, not only communication but also reception of a broadcast.

Users of these communication terminals and receivers select an assigned particular center frequency (center frequency) from many frequencies to conduct communication and receive a desired broadcast by selecting a frequency. Of the operations, a communication by a portable terminal will be further described by using an example.

FIG. 1 shows an available frequency band and a principle of a frequency search in a mobile communication service. Of the drawing, FIG. 1(a) shows an available frequency band prescribed by international standards for mobile communication services. According to International Mobile Telecommunication (IMT) 2000, it is internationally prescribed that each of the frequency bands meshed in FIG. 1(a), namely, a band from 1920 MHz to 1980 MHz and a band from 2110 MHz to 2170 MHz is to be used by portable terminals. In the frequency bands shown in FIG. 1(a), for example, a frequency band from 1980 MHz to 2110 MHz is assigned to other usages such as operation for the cosmos. In our country, in addition to the two frequency bands for mobile communication services shown in FIG. 1(a), other several frequency bands not shown therein are independently allocated as available frequency bands for mobile terminals.

Incidentally, according to the Wideband Code Division Multiple Access (WCDMA) as a wide-band Code Division Multiple Access (CDMA) adopting the spectrum spread technique, the system frequency allocated to base stations has a width of 5 MHz as shown in FIG. 1(b), and the center frequency of a channel employed by a portable terminal for communication is set with an interval of 200 KHz in association with these base stations. To make a search for a frequency to be used by a portable terminal to conduct a call and communication (to be simply called communication hereinbelow) via a base station, it is required to make a search for each frequency shown below, where the lower-limit center frequency is assumed as $f_1$ in the available frequency bands.

$f_1, f_1+200$ KHz, $f_1+400$ KHz, $f_1+600$ KHz,

When a portable terminal is powered to start communication, it accesses a center frequency, which is used in the last communication for a base station and which is stored, to attempt communication with a base station using the center frequency. If the place where the user's portable terminal is turned off considerably differs from the place where the terminal is again powered, it is not possible to start communication with a base station by use of the center frequency; hence, so-called "out of zone" is displayed depending on cases. Therefore, in this situation, the frequency scan described above is carried out for the frequency available for the portable terminal.

However, in the conventional method in which the frequency is searched in the unit of 200 KHz, it is required to repeatedly conduct the frequency search about several tens of million times at the maximum until the spread code sequence is synchronized. Hence, there exists a problem in which the search requires such time as well as the battery is remarkably consumed before the portable terminal starts communication with the base station. To cope therewith, it has been proposed to implement a high-speed cell search by identifying a long code or by narrowing down the range of long codes (reference is to be made to, for example, patent document 1).

According to the proposal, through L repetitions of M long code mask symbols, it is possible to identify a code called a long code unique to a base station or to narrow down a range of the codes. And, on the basis of information thus narrowed down, a correlational value is detected by use of a correlator, not shown. By determining a maximum value according to a result of the correlational value detection, a code with a highest correlation is determined as a long code. As a result, it is possible to narrow down long code candidates at an early stage and it is hence possible to reduce the initial synchronization time.

Patent Document 1: Japanese Patent Application Laid-Open Publication No. Hei 11-8607 (paragraph 0052, FIG. 7)

DISCLOSURE OF THE INVENTION

Problem to be Solved by the Invention

However, this proposal is accompanied by a problem that a complex circuit is required to identify a long code or to narrow down a range of long codes.

Description has been given above of a portable terminal which employs WCDMA; similarly, for frequencies of satellite communication, short-wave broadcasts, and medium-wave broadcasts in which a problem of interference easily takes place, it is necessary that the frequency allocation is adjusted between countries. For this purpose, as also shown in FIG. 1, one of the sectors of International Telecommunication Union (ITU), i.e., ITU Radiocommunication Sector (ITU-R) internationally adjusts the frequency allocation. At a meeting called World Radiocommunication Conference (WRC), frequencies are allocated to various apparatuses such as communication terminals which use electric waves of amateur radio communication and television broadcasts.

Use of radio frequencies is internationally standardized as above; however, it is a fact that the international restriction is not necessarily required to allocate frequencies to apparatuses of which radio waves have a limited reach. Also, due to the historical development, frequencies allocated to communication terminals such as mobile terminals with a limited reach of radio waves considerably depend on the locality of countries and the like. Additionally, for the broadcasts, the frequencies to be used and the contents thereof vary between the respective regions.

It is therefore an object of the present invention to provide a transmitting apparatus capable of easily notifying information regarding radio waves required for an objective apparatus, a communication apparatus or a receiving apparatus capable of easily setting a frequency required at each place, a communication system or a broadcast receiving system which employ the transmitting apparatus, the communication apparatus, and the receiving apparatus; and a control program, a communication method, and a broadcast receiving method to be used in the communication apparatus or the receiving apparatus.

Means for Solving the Problem

In accordance with the invention described in claim 1, a transmitting apparatus is provided with a radio wave information transmitting unit that constantly transmits radio wave information regarding various radio waves to be used for communication or a broadcast in a belonging area, by use of a radio wave having a predetermined particular frequency.

That is, in accordance with the invention described in claim 1, the transmitting apparatus includes a radio wave information transmitting unit that constantly transmits radio wave information regarding various radio waves to be used for communication or a broadcast in a belonging area, by use of a radio wave having a predetermined particular frequency. Hence, in the present invention, by receiving the radio wave having the particular frequency, it is possible to easily set a required frequency. Here, it is not necessarily required that the particular frequency is one frequency. In a situation where two or more radio wave information transmitting units disposed in different areas share part of their transmission areas and the receiving side is required to discriminate these units, there exist a plurality of particular frequencies; the transmitting apparatuses may respectively use the particular frequencies depending on purposes.

In accordance with the invention described in claim 2, a transmitting apparatus is provided with a radio wave information transmitting unit that constantly transmits radio wave information including a list of specifications in an associated area of various radio waves of which specifications likely vary between areas, by use of a radio wave having a predetermined particular frequency.

That is, in accordance with the invention described in claim 2, the transmitting apparatus includes a radio wave information transmitting unit that constantly transmits radio wave information including a list of specifications in an associated area of various radio waves of which specifications likely vary between areas, by use of a radio wave having a predetermined particular frequency. Consequently, in the present invention, by receiving the radio wave having the particular frequency, it is possible to easily set a required frequency.

Additionally, in accordance with the invention described in claim 11, a communication apparatus is provided with (a) a radio wave receiving unit that receives a radio wave having a predetermined particular frequency, (b) a radio wave information extracting unit that extracts, from the radio wave received by the radio wave receiving unit, radio wave information including a center frequency to be applied to the apparatus, and (c) a communication environment setting unit that sets a communication environment for communication with a base station by use of the radio wave information extracted by the radio wave information extracting unit.

That is, in accordance with the invention described in claim 11, when the communication apparatus sets a communication environment for the base station, it receives a radio wave having a predetermined particular frequency to extract radio wave information including a center frequency to be applied to the apparatus. When the communication apparatus moves from one position to another position, there exists a case where the communication environment with the base station is not known; however, by receiving the radio wave having the predetermined particular frequency, it is possible to know the center frequency to be applied to the apparatus.

Additionally, in accordance with the invention described in claim 12, a communication apparatus is provided with (a) a communication start unit that starts communication by setting a communication environment to a communication environment previously employed, (b) a radio wave receiving unit that receives a radio wave having a predetermined particular frequency if the communication by the communication start unit is not successfully conducted or in a case where another predetermined communication environment is beforehand prepared and the communication is not successfully conducted even in the communication environment, (c) a radio wave information extracting unit that extracts, from the radio wave received by the radio wave receiving unit, radio wave information including a center frequency to be applied to the apparatus, and a communication environment setting unit that sets a communication environment with a base station by use of the radio wave information extracted by the radio wave information extracting unit.

That is, the invention described in claim 12 handles a communication apparatus that is likely to change its position. In a situation, where such communication apparatus starts communication by setting a communication environment to a communication environment employed in the previous communication; if the communication is not successfully conducted in the communication environment or if another predetermined communication environment is beforehand prepared and the communication is not successfully conducted even in the communication environment; it is likely that the communication environment is changed due to the movement to a new place, and hence the radio wave receiving unit is employed to receive the radio wave having the predetermined particular frequency. Then, from the received radio wave, radio wave information including the center frequency to be applied to the apparatus is extracted to set the communication environment for communication with the base station by use of the radio wave information. Therefore, in a situation where the communication environment used in the previous communication is not kept remained for some reason and when the product is first powered, the communication environment can be similarly set.

Also in accordance with the invention described in claim 15, a receiving apparatus is provided with (a) a radio wave receiving unit that receives a radio wave having a predetermined particular frequency, (b) a radio wave information extracting unit that extracts, from the radio wave received by the radio wave receiving unit, radio wave information including a center frequency for respective broadcasts, and (c) a broadcast receiving unit that receives a desired broadcast by use of the radio wave information extracted by the radio wave information extracting unit.

That is, in the invention described in claim 15, in a situation where the receiving apparatus receives a broadcast in a new place, there exists a case in which a broadcast station cannot be selected; however, by receiving a radio wave having a predetermined particular frequency and then by extracting radio wave information including a center frequency of each broadcast, it is possible to receive the broadcast.

Furthermore, in the invention described in claim 16, a receiving apparatus is provided with (a) a broadcast reception start unit that starts broadcast reception by setting a reception environment to a reception environment previously employed for broadcast reception, (b) a radio wave receiving unit that receives a radio wave having a predetermined particular frequency if the broadcast reception by the broadcast reception start unit is not successfully conducted or in a case where another predetermined communication environment is beforehand prepared and communication is not successfully conducted even in the communication environment, (c) a radio wave information extracting unit that extracts, from the radio wave received by the radio wave receiving unit, radio wave information including a center frequency for respective broadcasts, and (d) a reception environment setting unit that sets a reception environment of a desired broadcast by use of the radio wave information extracted by the radio wave information extracting unit.

That is, the invention described in claim 16 handles a receiving apparatus that is likely to change its position. In a situation where such receiving apparatus starts broadcast reception by setting a reception environment to a reception environment employed in the previous broadcast reception; if the broadcast reception is not successfully conducted in the reception environment or if another predetermined communication environment is beforehand prepared and the communication is not successfully conducted even in the communication environment; it is likely that the broadcast reception environment is changed due to the movement to a new place, and hence the radio wave receiving unit is employed to receive the radio wave having the predetermined particular frequency. As a result, by extracting radio wave information including a center frequency of each broadcast, it is possible to set a reception environment of a desired broadcast to receive the broadcast.

Also, in accordance with the invention described in claim 17, a receiving apparatus is provided with (a) a radio wave receiving unit that receives a radio wave having a predetermined particular frequency, (b) a radio wave information extracting unit that extracts, from the radio wave received by the radio wave receiving unit, radio wave information for respective broadcasts receivable by the apparatus, and (c) a reception environment setting unit that sets a reception environment of a desired broadcast by use of the radio wave information extracted by the radio wave information extracting unit.

That is, in the invention described in claim 17, in a situation where the receiving apparatus receives a broadcast in a new place, there exists a case in which a broadcast station cannot be selected; however, by receiving a radio wave having a predetermined particular frequency and then by extracting therefrom radio wave information of each broadcast receivable by the apparatus by use of information such as positional information of the apparatus, radio wave information including a center frequency of each broadcast can be efficiently extracted to set a reception environment of a desired broadcast to receive the broadcast.

Moreover, in accordance with the invention described in claim 18, a receiving apparatus is provided with (a) a reception start unit that starts reception of a broadcast by setting a reception environment to a reception environment previously employed for reception, (b) a radio wave receiving unit that receives a radio wave having a predetermined particular frequency if the reception by the reception start unit is not successfully conducted or in a case where another predetermined communication environment is beforehand prepared and communication is not successfully conducted even in the communication environment, (c) a radio wave information extracting unit that extracts, from the radio wave received by the radio wave receiving unit, radio wave information for respective broadcasts receivable by the apparatus, and (d) a station selecting unit that conducts station selection for a desired broadcast station by use of the radio wave information extracted by the radio wave information extracting unit.

That is, the invention described in claim 18 handles a receiving apparatus that is likely to change its position. In a situation where such receiving apparatus starts broadcast reception by setting a reception environment to a reception environment employed in the previous broadcast reception; if the broadcast reception is not successfully conducted in the reception environment or if another predetermined communication environment is beforehand prepared and the communication is not successfully conducted even in the communication environment; it is likely that the broadcast reception environment is changed due to the movement to a new place, and hence the radio wave receiving unit is employed to receive the radio wave having the predetermined particular frequency. And by extracting, from the received radio wave information, radio wave information of each broadcast receivable by the apparatus to set a broadcast reception environment by use of the radio wave information. Therefore, in a situation where the reception environment used in the previous broadcast reception is not kept remained for some reason and when the product is first powered, the broadcast reception environment can be similarly set.

Also, in accordance with the invention described in claim 20, a communication system is provided with (a) a transmitting apparatus including a radio wave information transmitting unit disposed for each of geographically classified areas, that constantly transmits, by use of a predetermined particular frequency, radio wave information regarding various radio waves to be used for communication in an associated area, (b) a base station disposed in the associated area, and (c) a communication apparatus including a radio wave receiving unit that receives a radio wave having the predetermined particular frequency, a radio wave information extracting unit that extracts, from the radio wave received by the radio wave receiving unit, radio wave information including a center frequency to be applied to the apparatus, and a communication environment setting unit that sets a communication environment for communication with the base station by use of the radio wave information extracted by the radio wave information extracting unit.

That is, in the invention described in claim 20, a transmitting apparatus disposed for each of geographically classified areas constantly transmits, by use of a predetermined particular frequency, radio wave information regarding various radio waves to be used for communication in an associated area. Hence, information of the base station allocated in the area is transmitted as the radio wave information to the area. The communication apparatus receives the radio wave including the predetermined particular frequency sent from the transmitting apparatus currently allocated to the area to extract radio wave information including the center frequency to be applied to operation between the communication apparatus and the base station; it is hence possible to efficiently set a communication environment with respect to the base station.

Furthermore, in accordance with the invention described in claim 21, a broadcast receiving system is provided with (a) a transmitting apparatus including a radio wave information transmitting unit disposed for each of geographically classified areas, that constantly transmits, by use of a predetermined particular frequency, radio wave information regarding various radio waves to be used for a broadcast in an associated area, (b) a broadcast station disposed in the associated area, and a receiving apparatus including a radio wave receiving unit that receives a radio wave having the predetermined particular frequency, (c) a radio wave information extracting unit that extracts, from the radio wave received by the radio wave receiving unit, radio wave information including a center frequency to be applied to the apparatus, and a reception environment setting unit that sets a reception environment for receiving a broadcast of the broadcast station by use of the radio wave information extracted by the radio wave information extracting unit.

That is, in the invention described in claim 21, a transmitting apparatus disposed for each of geographically classified areas constantly transmits, by use of a predetermined particular frequency, radio wave information regarding various radio waves to be used for broadcasts in an associated area. Hence, information of the broadcast station allocated in the area is transmitted as the radio wave information to the area. The receiving apparatus receives the radio wave including the predetermined particular frequency sent from the transmitting apparatus currently allocated to the area to extract radio wave information including the center frequency to be applied to operation between the receiving apparatus and the broadcast station; it is hence possible to efficiently set a reception environment with respect to the broadcast station.

Also, a control program in accordance with the invention described in claim 22 is characterized by making (a) a computer of a communication apparatus execute, (b) radio wave receiving processing for receiving a radio wave having a predetermined particular frequency transmitted from a belonging area selected from a plurality of geographically classified areas, (c) radio wave information extracting processing for extracting, from the radio wave received by the radio wave receiving processing, radio wave information including a center frequency to be applied to the apparatus, and (d) communication environment setting processing for setting a communication environment for communication with a base station by use of the radio wave information extracted by the radio wave information extracting processing.

That is, the invention described in claim 22 handles a control program of a computer on the communication apparatus side. The control program receives, in the radio wave receiving processing, a radio wave having a predetermined particular frequency transmitted from a belonging area selected from a plurality of geographically classified areas and extracts, in the radio wave information extracting processing, from the received radio wave, radio wave information of the associated area including a center frequency to be applied to the apparatus. Then, by use of the local radio wave information, it is possible to easily set the communication environment with respect to the base station in the area.

Additionally, a control program in accordance with the invention described in claim 23 is characterized by making (a) a computer of a broadcast receiving apparatus execute (b) radio wave receiving processing for receiving a radio wave having a predetermined particular frequency transmitted from a belonging area selected from a plurality of geographically classified areas, (c) radio wave information extracting processing for extracting, from the radio wave received by the radio wave receiving processing, radio wave information including a center frequency for respective broadcasts, and (d) communication environment setting processing for setting a reception environment for receiving a desired broadcast by use of the radio wave information extracted by the radio wave information extracting processing.

That is, the invention described in claim 23 handles a control program of a computer on the broadcast receiving apparatus side. The control program receives, in the radio wave receiving processing, a radio wave having a predetermined particular frequency transmitted from a belonging area selected from a plurality of geographically classified areas and extracts, in the radio wave information extracting processing, from the received radio wave, radio wave information of the associated area including a center frequency to be applied to the apparatus. Then, by use of the local radio wave information, it is possible to easily set the broadcast reception environment to receive a desired broadcast in the area.

Also, a communication method in accordance with the invention described in claim 24 is characterized by including (a) a radio wave receiving step of receiving a radio wave having a predetermined particular frequency transmitted from a belonging area selected from a plurality of geographically classified areas, (b) a radio wave information extracting step of extracting, from the radio wave received by the radio wave receiving step, radio wave information including a center frequency to be applied to the apparatus, and (c) a communication environment setting step of setting a communication environment for communication with a base station by use of the radio wave information extracted by the radio wave information extracting step.

That is, the present invention handles a communication method of a communication apparatus. In this communication method, in the radio wave receiving step, a radio wave having a predetermined particular frequency transmitted from a belonging area selected from a plurality of geographically classified areas is received; and in the radio wave information extracting step, from the received radio wave, radio wave information of the associated area including a center frequency to be applied to the apparatus is extracted. Then, by use of the local radio wave information, it is possible in the communication environment setting step to easily set the communication environment with respect to the base station in the area.

Moreover, a broadcast receiving method in accordance with the invention described in claim 25 is characterized by including (a) a radio wave receiving step of receiving a radio wave having a predetermined particular frequency transmitted from a belonging area selected from a plurality of geographically classified areas, (b) a radio wave information extracting step of extracting, from the radio wave received by the radio wave receiving step, radio wave information including a center frequency for respective broadcasts, and (c) a communication environment setting step of setting a reception environment for receiving a desired broadcast by use of the radio wave information extracted by the radio wave.

That is, the present invention handles a broadcast receiving method of a broadcast receiving apparatus. In this broadcast receiving method, in the radio wave receiving step, a radio wave having a predetermined particular frequency transmitted from a belonging area selected from a plurality of geographically classified areas is received; and in the radio wave information extracting step, from the received radio wave, radio wave information of the associated area including a center frequency to be applied to the apparatus is extracted. Then, by use of the local radio wave information, it is possible in the reception environment setting step to easily set the reception environment to receive a desired broadcast in the area.

Advantages of the Invention

In accordance with the present invention as described above, in respective areas geographically subdivided, the transmission apparatus constantly transmits the radio wave information regarding respective radio waves to be used for communication or a broadcast, by use of a radio wave having a predetermined particular frequency; hence, by receiving the radio wave, it is possible to easily know the center frequency to be used by the base station and the broadcast station in the area. That is, since frequencies in a more limited range as compared with center frequencies to be used in a plurality of areas can be set as the retrieval objects, it is possible to achieve simple frequency retrieval. Also, as a result, the retrieval device for the communication apparatus or the receiving apparatus can be produced at a lower cost and with higher reliability. Moreover, since a frequency in an area or a communication or reception environment can be easily acquired to be set for operation, it is possible to set the communication or reception environment without always storing the communication environment and the reception environment in storage unit.

BEST MODE FOR CARRYING OUT THE INVENTION

Next, description will be given in detail of the present invention by using embodiments.

Exemplary Embodiment 1

FIG. 2 shows a primary section of a communication-broadcast system in an exemplary embodiment of the present invention. The communication-broadcast system 100 includes a radio wave tower 101 for each of the geographically subdivided areas. In an area shown in this diagram, there is employed a relatively high radio wave tower 101 to cover a plurality of cities, towns, villages, or prefectures. The radio wave tower 101 is connected to a radio wave information transmitting apparatus 102 to notify various radio waves and a broadcast transmission apparatus 103 to transmit a broadcast radio wave. Radio wave information 104 and a broadcast signal 105 for television and radio sent from the radio wave tower 101 can be received by a portable terminal 106 as a communication apparatus of the embodiment and a notebook personal computer 107 as a personal computer of notebook type including a communication function and a broadcast receiving function.

In addition, although only one Global Positioning System (GPS) satellite 108 is shown in the diagram, a plurality of GPS satellites 108 are turning round the earth in the sky, and the plural GPS satellites 108 transmit time signals 109. The signals 109 can also be received by the portable terminal 106 and the notebook personal computer 107. Each of the portable terminal 106 and the notebook personal computer 107 can determine, by analyzing the time signals 109 sent from the plurality of GPS satellites 108, a current position according to a latitude and a longitude at which it is currently placed.

In addition, the portable terminal 106 and the notebook personal computer 107 can communicate with a nearby base station 110 using a radio wave 111. The base station 110 is connected to a cellular communication network 112. The network 112 is connected to other communication networks such as a telephone network and the Internet.

FIG. 3 shows an outline of the configuration of the portable terminal in this embodiment. The plurality of portable terminal 106 includes a main controller 124 in which a Central Processing Unit (CPU) 121, a Read Only Memory (ROM) 122 having stored a control program, and a Random Access Memory (RAM) 123 as a work memory are arranged. Part of the RAM 123 includes a non-volatile memory. The main controller 124 is connected to various circuit parts including hardware or software that is implemented when the CPU 121 executes the control program, and conducts overall control of the various circuit parts.

Of these circuit parts, the radio wave information receiving section 126 receives the radio wave information 104 obtained from the radio wave tower 101 shown in FIG. 2 to store the information in the RAM 123. A GPS receiving section 127 calculates a current position of the portable terminal 106 by use of the time signals 109 sent from the GPS satellites 108 shown in FIG. 2. A cellular communication section 128 transmits/receives a call and communication data by conducting communication with the base station 110 shown in FIG. 2. An operation section 129 includes various key switches, not shown, to conduct, for example, a dial operation and a character input. A display controller 131 carries out control to display characters and images on a display 132. An audio input and output controller 133 is connected to a microphone 134 and a speaker 135 and is used to produce a speech of a call, a call termination sound, a music piece, or television sound and voice. A television receiving section 136 is a circuit part to receive a television signal.

In the notebook personal computer 107 of the embodiment, a communication card, not shown, is installed in the main section of the apparatus to provide the apparatus with functions of the radio wave information receiving section 126, the GPS receiving section 127, and the television receiving section 136 shown in FIG. 3. Hence, the circuit configuration of the notebook personal computer 107 will not be shown. Incidentally, it is possible to provide a motherboard, not shown, of the notebook personal computer 107 with functions of such communication card.

FIG. 4 shows an example of allocation of frequencies to radio wave information sent from the radio wave tower. In the case of this embodiment, as the radio wave information 104 corresponding to an area to be covered by the radio wave tower 101 shown in FIG. 2, frequencies $f_1$-$f_{14}$ are allocated as shown in the diagram respectively to each channel (broadcast station) information of a digital broadcast, WCDMA, cdma2000, and the radio Local Area Network (LAN). Therefore, for example, by assuming that the portable terminal 106 shown in FIG. 2 accomplishes communication with the base station 110 in the WCDMA scheme, it is only needed in this area to make a search for frequency ranges respectively having center frequencies $f_3$-$f_4$, $f_1$-$f_7$, $f_9$-$f_{10}$, and $f_{11}$-$f_{12}$.

Moreover, in a case where the radio wave tower 101 is a high tower like the Tokyo Tower (Nippon Denpato) and has high electric power for transmission, since the area of reach of radio waves is enlarged, the radio wave information 104 includes information to cover the wide area. Hence, to communicate with the base station 110, each of the portable terminal 106 and the notebook personal computer 107 can further narrow down the center frequencies of the associated areas among from areas of the frequencies $f_3$-$f_4$, $f_6$-$f_7$, $f_9$-$f_{10}$, and $f_{11}$-$f_{12}$ by determining its current place by use of the GPS receiving section 127 shown in FIG. 3.

Hence, the radio wave information 104 describes the frequency allocated to a radio wave type shown in FIG. 4, using a relation to positional information. Similarly, each of the frame timing, operator information and pilot information as a mark at reception is described in relation to positional information. Incidentally, the pilot information is a pilot code in the CDMA scheme and is a pilot frequency in the case of the Orthogonal Frequency Division Multiplexing (OFDM) scheme. Therefore, for example, the portable terminal 106 extracts, on the basis of the positional information attained by the GPS receiving section 127, frequencies associated with the WCDMA scheme and the CDMA scheme from the radio wave information 104, and finally can determine a center frequency to communicate with the base station 110 at the place in association with its own communication scheme.

There also exists a case where the radio wave information 104 is sent from, in place of the big radio wave tower 101, a small radio wave tower or a small facility covering a local area such as an area between buildings. In such case, the area to receive the radio wave information 104 is limited to a small area. Hence, in this case, the radio wave information 104 is local information corresponding to the small area. In such situation, the center frequencies as candidates can be fully limited only by sorting the radio wave information 104 simply in association with its own transmission scheme, and a high-speed search is achieved. Naturally, the frequencies can be further selected according to the positional information by use of the GPS receiving section 127 to increase the search speed to mitigate the load imposed on the portable terminal 106.

In the case of the terrestrial digital broadcast, the situation slightly differs from that of the radio communication by the portable terminal 106 described above. First, on a occasion where the radio wave information 104 is transmitted and the broadcast signal 105 for television and radio is transmitted as in the case of the radio wave tower 101 shown in FIG. 2, a frequency and a station name which are obtained for each station and information of a program obtained in addition thereto according to necessity match with the reception area; it is hence not required to conduct selection for the obtained information on the basis of the positional information of a current place of the portable terminal 106 or the notebook personal computer 107. The reason is as follows: for example, assuming that the radio wave tower 101 is the Tokyo Tower described above, the metropolis of Tokyo and prefectures adjacent thereto construct the reception range of the radio wave information 104 and simultaneously, there exists one set of television channels (broadcast stations) in the wide range. Naturally, in a case of a configuration where the radio wave tower 101 to transmit the radio wave information 104 is geographically different from the radio wave tower 101 to send the broadcast signal 105, it is required depending on cases to select television channels (broadcast stations) from the radio wave information 104 according to the place to exclude the channels (broadcast stations) not to be displayed.

FIG. 5 shows service areas respectively of the communication and the television broadcast by the portable terminal described above. The outer-most big circle indicates a radio wave information service area as a range of reach of the radio wave information 104 sent from the radio wave tower 101 shown in FIG. 2. In this embodiment, assuming that the broadcast radio wave is similar in the characteristics and transmission power to the radio wave to transmit the radio wave information 104, the radio wave information service area 151 almost matches the broadcast service area of the broadcast signal 105.

The radio wave information service area 151 is remarkably greater in ordinary cases than a base station service areas 152 of the base stations including the base station 110 exemplified in FIG. 2. Hence, in the service area 151, a lot of base station service areas $152_1$, $152_2$, . . . exist in ordinary cases. For example, in a case where the portable terminal 106 exists in the base station service area $152_1$, by using the radio wave information 104 attained from the radio wave information receiving section 126 (FIG. 3), the areas can be narrowed using the positional information determined through the reception of the GPS receiving section 127 (FIG. 3) to extract candidates of the central frequency for communication with the base station $110_1$. To teleview the television broadcast by the portable terminal 106 using the television receiving section 136 (FIG. 3), it is only necessary to tune to either one of the broadcast channels in the broadcast service area almost matching the radio wave information service area 151.

Additionally, if the notebook personal computer 107 is located in the base station service area $152_5$, by using the positional information determined through the reception of the GPS receiving section 127 (FIG. 3) based on the obtained radio wave information 104, it is possible to extract the center frequency for communication with the base station $110_5$. To teleview the television broadcast by use of the television receiving section 136 (FIG. 3) of the notebook personal computer 107, it is only necessary to similarly tune to either one of the broadcast channels in the broadcast service area almost matching the radio wave information service area 151.

FIG. 6 shows an outline of control of the portable terminal from when the terminal is powered to when the communication is conducted. Description will be given of both of FIGS. 2 and 3. When the portable terminal 106 is powered through software processing (Y in step S201), the CPU 121 in the main controller 124 reads the center frequency used for the previous communication from the nonvolatile memory area of the RAM 123 (step S202). Then, based thereon, the CPU 121 attempts communication with the base station 110 (step S203). If the communication with the base station 110 is successfully conducted (Y in step S204), the CPU 121 carries out the ordinary mode (ordinary communication mode) which is conventionally conducted (step S205). Detailed description of the ordinary communication mode will be avoided.

On the other hand, if the communication with the base station 110 is not successfully conducted (N), the CPU 121 attempts reception of the radio wave information 104 from the radio wave tower 101 of the location (step S206). It is determined that the frequency of the radio wave employed as the radio wave information 104 is beforehand selected from several frequencies to prevent information items sent from the respective radio wave towers 101 from mixing with each other on the same frequency. Therefore, the portable terminal 106 reads a list of these radio waves from the ROM 122 and attempts reception of the radio wave information 104 by sequentially selecting one frequency therefrom. For the radio wave information 104 with a highest reception level, if the level is equal to or more than a predetermined reception level, the reception is successfully conducted.

If the reception of the radio wave information 104 is successfully conducted as above (Y in step S207), the CPU 121 conducts a radio wave information receiving mode as a communication mode using the radio wave information 104 (step S208). This will be specifically described later.

If the reception of the radio wave information 104 is not successfully conducted (N in step S207), it is likely that there does not exist in the area a radio wave tower 101 like that shown in FIG. 2 or there exists failure in the transmission system of the radio wave information transmitting apparatus 102. In this case, it is not possible to simply retrieve the center frequency using the radio wave information 104. Hence, in this situation, the CPU 121 conducts the all scan communication mode of the related art in which the associated central frequencies are sequentially scanned as described in conjunction with FIG. 15 (step S209). In this case, although the narrowing down of the range of frequencies is carried out in association with the communication scheme of the portable terminal 106, there is executed processing to conduct frequency selection in a frequency-by-frequency fashion until the central frequency available for communication is detected. Naturally, if the GPS receiving section 127 shown in FIG. 3 can determine a country or a region in which the portable terminal 106 exists, it is possible to restrict the range of the frequencies to be searched by beforehand storing a frequency search range of the country or region in the ROM 122. This all scan communication mode has been conventionally conducted, and hence details of execution thereof will also be avoided.

FIG. 7 specifically shows processing in the radio wave information receiving mode in step S208 of FIG. 6. In the radio wave receiving mode, the CPU 121 of the portable terminal 106 shown in FIG. 3 reads from the ROM 122 the own information such as a maker and a type of the terminal (step S221). And then, the CPU 121 extracts a list of frequencies associated with the portable terminal 106 from the communication data area of the received radio wave information 104 (step S222). That is, since the radio wave information 104 belongs to the radio wave information service area 151 (FIG. 5) and is classified into communication data to be used for communication in the portable terminal 106 and broadcast data to teleview the broadcast using the portable terminal 106; in this situation, the CPU 121 extracts, from the communication data, a list of center frequencies of the base stations 110 corresponding to the communication scheme such as the CDMA scheme of the associated maker.

The portable terminal 106 retrieves a center frequency for communication with the nearby base station 110 from the list. In the operation, a check is first made to determine whether or not many retrieval objects have been extracted (step S223). The radio wave information service area 15 is wide for a very high radio wave tower such as the 333 meters high Tokyo Tower (Tokyo), the 540 meters high Ostanchino TV Tower (Moskow), the 553 meters CN Tower (Canada), or the Second Tokyo Tower (Tokyo) designed to be 610 meters high. Hence, the number of retrieval objects for the center frequency of the base station 110 is also increased.

If the retrieval objects are more than a predetermined quantity (Y in step S223), the CPU 121 obtains the current positional information of the portable terminal 106 through the reception by the GPS receiving section 127 (step S224). Then, by use of the positional information, the CPU 121 narrows down the center frequencies as retrieval objects (step S225). Next, a search is sequentially made for each of the narrowed range of center frequencies, while actually conducting communication, to determine which one thereof suits for the communication of the portable terminal 106 (step S226). As a result, the portable terminal 106 conducts subsequent communication with the base station 110 using one center frequency thus selected (step S227).

In contrast thereto, if there exists in step S223 a small number of center frequencies as retrieval objects (N), the portable terminal 106 conducts neither the acquisition of the positional information of the terminal by the GPS nor the narrowing down of retrieval objects, and sequentially makes a search for each of the extracted center frequencies while actually conducting communication (step S226). Thereafter, the portable terminal 106 carries out subsequent communication with the base station 110 using one center frequency thus selected (step S227).

Incidentally, although this is also the case of the notebook personal computer 107 of the embodiment, the portable terminal 106 of the embodiment includes a televiewing function. In this connection, description will next be given of processing when the portable terminal 106 is used to teleview a television program.

FIG. 8 shows an outline of the television receiving section shown in FIG. 3. The television receiving section 136 includes an Ultra High Frequency/Very High Frequency (UHF/VHF) antenna 161 to receive a terrestrial digital broadcast and a terrestrial analog broadcast, a television broadcast tuner section 164 including a broadcast receiving tuner 162 and a channel decoder 163, and a televiewing section 165. The tuner 162 of the embodiment copes with terrestrial waves in the digital scheme and the conventional analog scheme, which will be described later.

The channel decoder 163 includes a mobile dedicated Large Scale Integration (LSI) and executes processing for a terrestrial digital broadcast such as Orthogonal Frequency Division Multiplexing (OFDM) demodulation, hierarchic separation, de-interleaving, and viterbi decoding. The televiewing section 165 selects a station through the channel scan and decodes audio and video by an integral Audio Visual decoder. The video is compressed by Moving Picture Experts Group 4 (MPEG4) and audio data is compressed by Moving Picture Experts Group phase 2-Advanced Audio Coding (MPEG2-AAC). The AV decoder may also be disposed in the display controller 131 and the audio input and output controller 133 shown in FIG. 3.

The television receiving section 136 of the embodiment selectively receives one channel of a broadcast for mobiles contained in the received terrestrial digital broadcast. The video of the received channel is displayed on the display 132 (FIG. 3) and the sound is produced by the speaker 135 (FIG. 3) or an external speaker, not shown.

FIG. 9 shows a relationship between each broadcast channel and segments in the one-segment terrestrial digital broadcast adopted in Japan. Each of channel data items $171_M$, $171_{M+1}$, $171_{M+2}$, . . . of respective television broadcasts includes 13 segments $172_1$-$172_{13}$. The television receiving section 136 shown in FIG. 3 selectively receives the seventh segment $172_7$ at the center. For the seventh segment $172_7$, the terrestrial broadcast of relatively high quality that is broadcasted in the other segments $172_1$-$172_6$, $172_8$-$172_{13}$ is simultaneously broadcasted in a state in which the number of pixels is reduced, to thereby implement the simultaneous broadcast. Due to the digital broadcast, the broadcast can be stably received when compared with the ground-wave analog broadcast of the related art.

FIG. 10 shows a data format of another terrestrial digital broadcast that can be received by the portable terminal of the embodiment. This is primarily adopted in Europe and is called a Digital Video Broadcasting Handheld (DVB-H) scheme. According to the DVB-H scheme, all segments of one particular channel 174 transmit information of the broadcast contents of the other channels $175_1$, $175_2$, . . . by reducing the number of pixels in a subdivided way in which the information is subdivided into segments $176_A$, $176_{A+1}$, $176_{A+2}$, . . . . Therefore, each of the segments $176_A$, $176_{A+1}$, $176_{A+2}, \ldots$ is associated with one channel of the segment-scheme terrestrial digital broadcast.

FIG. 11 shows a flow of processing when a television program is watched by use of the portable terminal of the embodiment. When powered, the portable terminal 106 of the embodiment first executes processing for communication shown in FIG. 6. Hence, when the portable terminal 106 is powered in a new place such as a foreign county, the radio wave information 104 of the place is stored in the RAM 123 (FIG. 3) in step S206 of FIG. 6. Also, when the portable terminal 106 is first powered in the country such as Japan where the terminal is purchased, the radio wave information 104 is similarly stored in the RAM 123.

When the user of the portable terminal 106 selects "Television" on an operation screen, not shown, or pushes a dedicated "Television" switch, not shown, to watch a television program (Y in step S241 of FIG. 11), broadcast data including a broadcast mode is read from the latest radio wave information 104 stored in the RAM 123 (step S242). Since the tuner 162 (FIG. 8) of the embodiment copes with the one-segment scheme and the DVB-H scheme of the terrestrial digital broadcast and the terrestrial analog scheme, a check is made to determine which one of the schemes is the broadcast mode (step S243, step S244).

If it is determined that the broadcast mode is the one-segment scheme of the terrestrial digital broadcast (Y in step S243), the receiving circuit of the one-segment scheme is selected in the tuner 162 (step S245). A program of the broadcast station having the channel number stored in the RAM 123 is received to be reproduced (step S246). This is conducted such that the contents of the current broadcast in the previously selected channel is first outputted to make the user change the channel according to necessity. As a result, when the user first televiews in a new place, a program of the channel number having selected in the previous place is provisionally displayed. Also, in the case of the embodiment, if there exists no broadcast station having the corresponding channel number, there is displayed, in place of the contents of the program described above, the contents of a program of a broadcast station having a channel number set as a default value.

On the other hand, if it is determined that the broadcast mode determined from the latest radio wave information 104 is the DVB-H scheme (N in step S243; Y in step S244), the receiving circuit of the DVB-H scheme is selected in the tuner 162 (step S247). Then, a program of a broadcast station having the channel number stored in the RAM 123 is received to be reproduced (step S246).

If it is determined that the broadcast mode is not the DVB-H scheme (N in step S244), the receiving circuit of the analog scheme is selected in the tuner 162 (step S248). For the receiving circuit of the analog scheme, there are disposed a circuit of the National Television System Committee (NTSC) scheme used in Japan and the U.S.A. and a circuit of the Phase Alternation by Line (PAL) scheme used in Europe and in other areas; hence, either one thereof is selected according to the broadcast mode.

In this regard, there are various terrestrial digital broadcasts such as Terrestrial-Digital Multimedia Broadcasting (T-DMB) as a terrestrial digital media broadcast and Media Forward Link Only (FLO; registered trademark) as services to wholesale multi-channel video delivery to carriers. Hence, depending on the communication terminals such as a portable terminal, before selecting the receiving circuit of the analog scheme as the next best measure in step S248, a check may be made to determine whether or not the broadcast mode matches a communication scheme of one of these terrestrial digital broadcasts.

Also, in a case where the receiving circuit of the tuner 162 is set through the processing in step S248, a program of a broadcast station having the channel number stored in the RAM 123 is received to be reproduced by the receiving circuit (step S246).

When the televiewing is started as above, the user can conduct a channel operation to change the program contents (step S249) or an operation to terminate the televiewing (step 250). If a channel operation is conducted (Y in step S249), the channel number is stored in the RAM 123 (step S251) and the process returns to step S246. If the user operates to terminate the televiewing (Y in step S250), the processing for the televiewing is terminated (end).

Although description has been given above mainly of the portable terminal 106, similar processing may be executed in a situation where the notebook personal computer 107 conducts communication including a call or reception of a broadcast by using the radio communication function. This also applies to the communication terminal such as a PDA, not shown.

<First Variation of the Invention>

In accordance with the present invention, since the radio wave information 104 is obtained in each place, it is possible to provide a service that makes the user preferentially select therefrom information that is higher in quality. For example, assume that a television station is transmitting the same broadcast contents in the conventional terrestrial analog scheme and the terrestrial digital scheme. In this situation, there can be in general conducted a higher-quality reception in images and sound quality by receiving the broadcast in the terrestrial digital scheme; however, in some cases, the user not knowing this televiews by selecting the station in the conventional terrestrial analog scheme. To remove such inconvenience, it is only necessary to include, in the radio wave information, information of a note indicating a relationship between the terrestrial analog scheme and the terrestrial digital scheme.

FIG. 12 shows, as a first variation of the present invention, a flow of a channel selecting operation when such note information is present in the radio wave information. When the user selects a channel to teleview a program (Y in step S261), the CPU 121 shown in FIG. 3 makes a check to determine whether or not the channel as the broadcast object is of the terrestrial analog scheme (step S262); if it is of the terrestrial digital scheme (N), the CPU 121 selects a frequency of the channel without conducting any change (step S263). That is, in this situation, neither the broadcast mode nor the channel is changed.

In contrast thereto, if the user selects a channel of the terrestrial analog scheme (Y in step S262), the CPU 121 makes a search through the radio wave information 104 to determine presence or absence of a note indicating a broadcast mode higher in the image and sound quality for programs of the channel (step S264). In this example, a search is made to determine presence or absence of the same program in the terrestrial digital scheme. If such program is absent (N in step S265), the CPU 121 goes to step S263 to conduct the channel selection using the channel selected by the user, with the broadcast mode kept unchanged.

If the same program in the terrestrial digital scheme is present (Y in step S265), the CPU 121 changes the broadcast mode and the channel indicated by the note information according to the note information (step S266). Then, the CPU 121 selects a frequency of the channel thus changed (step S263). Incidentally, depending on apparatuses, if there exists a channel with higher quality in the image and sound quality of the same broadcast station, a display urging a change to the channel can be presented on the display 132 (FIG. 3) for a fixed period of time to wait for user's selection. In this case, it is not particularly necessary that the apparatus side determines whether or not the same broadcast is being broadcast.

The changes of the broadcast mode and the channel may also be carried out between the radio AM broadcast and the radio FM broadcast. Due to the services of the broadcast mode and channel changes, the user can receive a better televiewing service in a range of performance of the portable terminal 106 or the notebook personal computer 107.

<Second Variation of the Invention>

FIG. 13 shows control processing of the portable terminal in a second variation of the present invention, namely, processing of part of the processing shown in FIG. 6 of the embodiment. In the preceding embodiment, if the communication with the base station 110 is not successfully conducted in step S204 of FIG. 6 (N), an attempt is made to receive the radio wave information 104 from the radio wave tower 101 in the place (step S206). In the variation of the present invention, if the communication with the base station 110 is not successfully conducted, a check is made to determine presence or absence of other communication environments for the portable terminal 106 to communicate with the base station 110 (step S301). In this connection, "other communication environments" imply that if there exists another frequency to be used by the same operator, the setting is changed to predetermined other items such as a center frequency, a radio scheme, frame timing, and a pilot code to set the frequency. In the case of the example of FIG. 12, the determination of presence or absence of other communication environments indicates that if a program ordinarily televiewed by a receiver in the terrestrial digital scheme cannot be any more watched by the receiver, a check is made to determine presence or absence of other communication environments to attempt viewing the program by changing the scheme to the terrestrial analog scheme of the same broadcast station.

Resultantly, if the other communication environments are present for communication (Y in step S301), the CPU 121 sets the communication environments (step S302) and goes to step S205 to conduct communication. On the other hand, if it is determined that the other communication environments are absent for communication (N in step S301), the CPU 121 goes to step S206 to attempt receiving the radio wave information 104 from the radio wave tower 101.

<Third Variation of the Invention>

Description has been given of the retrieval and the selection of the center frequency for FIG. 7 of the embodiment; however, if other information items such as the framing timing and the pilot information are described as the radio wave information 104, based on these items, the communication environments can be set for the portable terminal 106 to more smoothly start communication with the base station 110.

FIG. 14 shows an outline of communication control of the portable terminal for the base station in the third variation of the present invention, specifically presenting steps S226 and S227 of FIG. 7 when communication environments are set for the center frequency and the frame timing. Description will be given by referring also to FIG. 2. In this variation, the portable terminal 16 respectively extracts the associated communication scheme, the center frequency of the frequency allocation, and the frame timing based on the type of the own terminal (step S401). Then, the portable terminal 106 attempts receiving a signal from the base station 110 by combining one of the center frequencies with one frame timing value possibly used for transmission from the base station 110 (step S402). If the reception is not successfully conducted (N in step S403), the portable terminal 106 sets the center frequency and the frame timing to another combination in the extracted range (step S404) and returns to step S402 to attempt the reception.

In this way, if a signal is successfully received from the base station 110 using the center frequency and the frame timing (Y in step S403), the portable terminal 106 selects, using the frame timing of the signal sent from the base station 110 as a start point, one of the frame timing values extracted in step S401 for the portable terminal 106 to conduct transmission to the base station 110 and transmits a reply to the base station 110 at this frame timing (step S405). If the reply from the portable terminal 106 is not successfully conducted (N is step S406), the timing is changed to other one of the frame timing values extracted for the portable terminal 106 to conduct transmission to the base station 110 (step S407), and the process goes to step S405 to send a reply to the base station 110.

In this way, if the reply is successfully conducted by correctly setting, at a certain point of time, the frame timing for the transmission from the portable terminal 106 to the base station 110 (Y in step S406), subsequent communication is continuously conducted therebetween by use of the center frequency and the frame timing thus set (step S408).

Incidentally, in the embodiment described above, as candidates of the radio wave information to be assigned to the communication terminal, there have been described, in addition to the center frequency, the radio scheme, the fame timing, the pilot code and frequency, and the operator information; however, the candidates are not limited to these items. For example, in the Personal Digital Cellular (PDC) scheme and the Global System for Mobile (GSM) scheme, there exists a case where the frequency of the control signal to be used to start communication is set to a particular frequency. In such case, the predetermined frequency and the timing information are effectively included in the radio wave information, as information necessary to start communication. In the Orthogonal Frequency Division Multiplexing (OFDM), this similarly applies to a particular subcarrier.

Naturally, the present invention is applicable not only to specific cellular communication systems such as the PDC scheme as listed above. The present invention is characterized in that the radio wave information regarding various radio waves to be used in communication or broadcasts is transmitted using a radio wave having a predetermined particular frequency, and hence is naturally applied to various communication systems.

Also, for the embodiments described above, description has been given of an example of the portable terminal 106 or the notebook personal computer 107 using the base station 110 connected to the cellular communication network 112; however, the present invention is applicable also to a frequency search for a wireless LAN.

Additionally, for the embodiments, description has been given of the televiewing; however, the present invention is also applicable to the frequency selection for radio stations such as Amplitude Modulation (AM), Frequency Modulation (FM), and terrestrial digital radio stations.

Moreover, for the embodiments, description has been given by assuming that the radio wave information 104 is transmitted from a radio wave tower and a small-sized transmission facility; however, there may naturally be employed

BRIEF DESCRIPTION OF DRAWINGS

FIG. 7 is a flowchart showing processing in the radio wave information receiving mode in step S208 of FIG. 6.

FIG. 14 is a flowchart showing an outline of the communication control of the portable terminal for the base station in the third variation of the present invention.

DESCRIPTION OF REFERENCE NUMERALS

Figure 1:
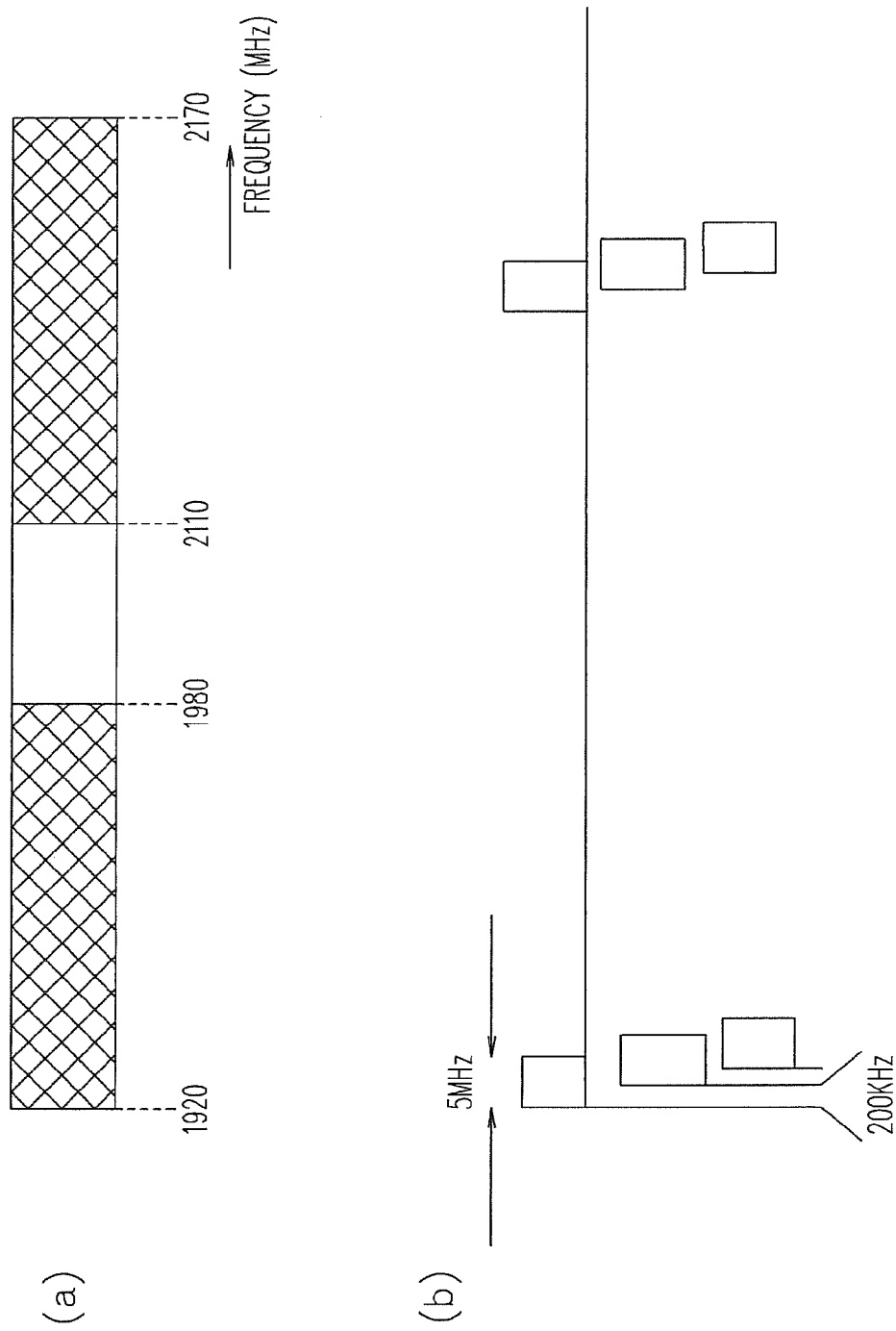
FIG. 1 is an explanatory diagram showing an available frequency band and a principle of a frequency search in a mobile communication service.
Figure 2:
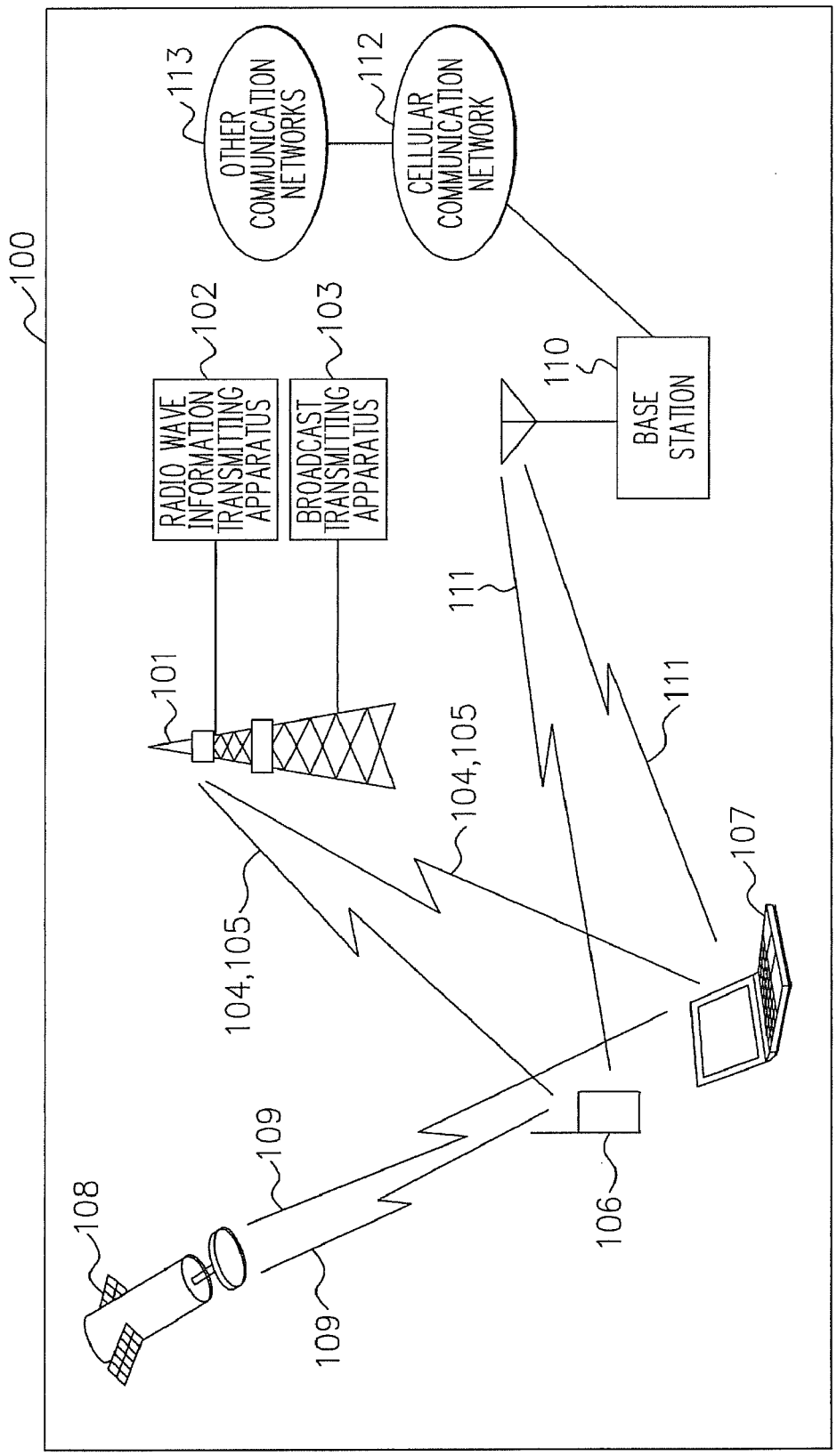
FIG. 2 is a system configuration diagram showing an outline of a communication system in an exemplary embodiment of the present invention.
Figure 3:
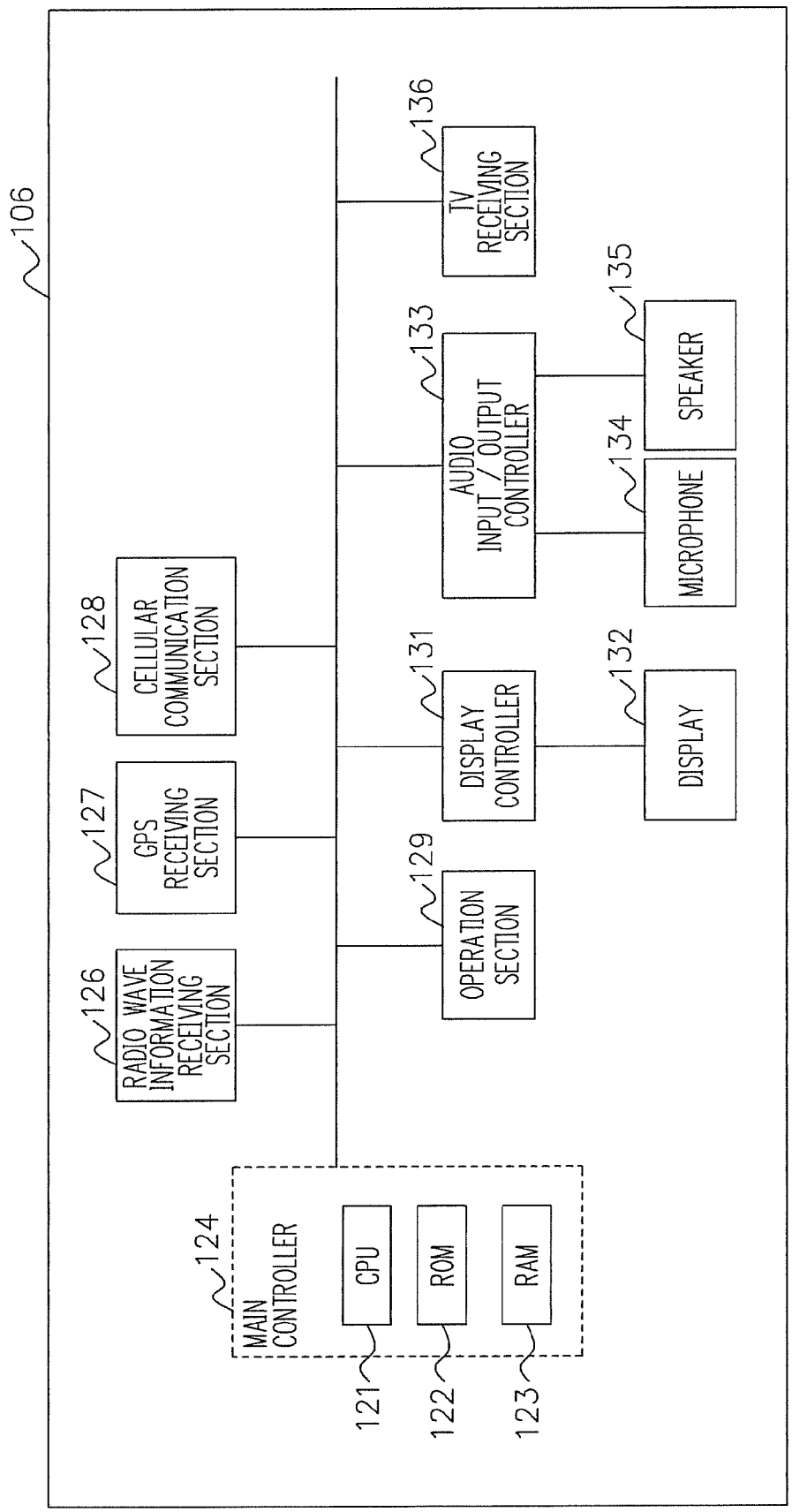
FIG. 3 is a block diagram showing an outline of the configuration of a portable terminal in this embodiment.
Figure 4:
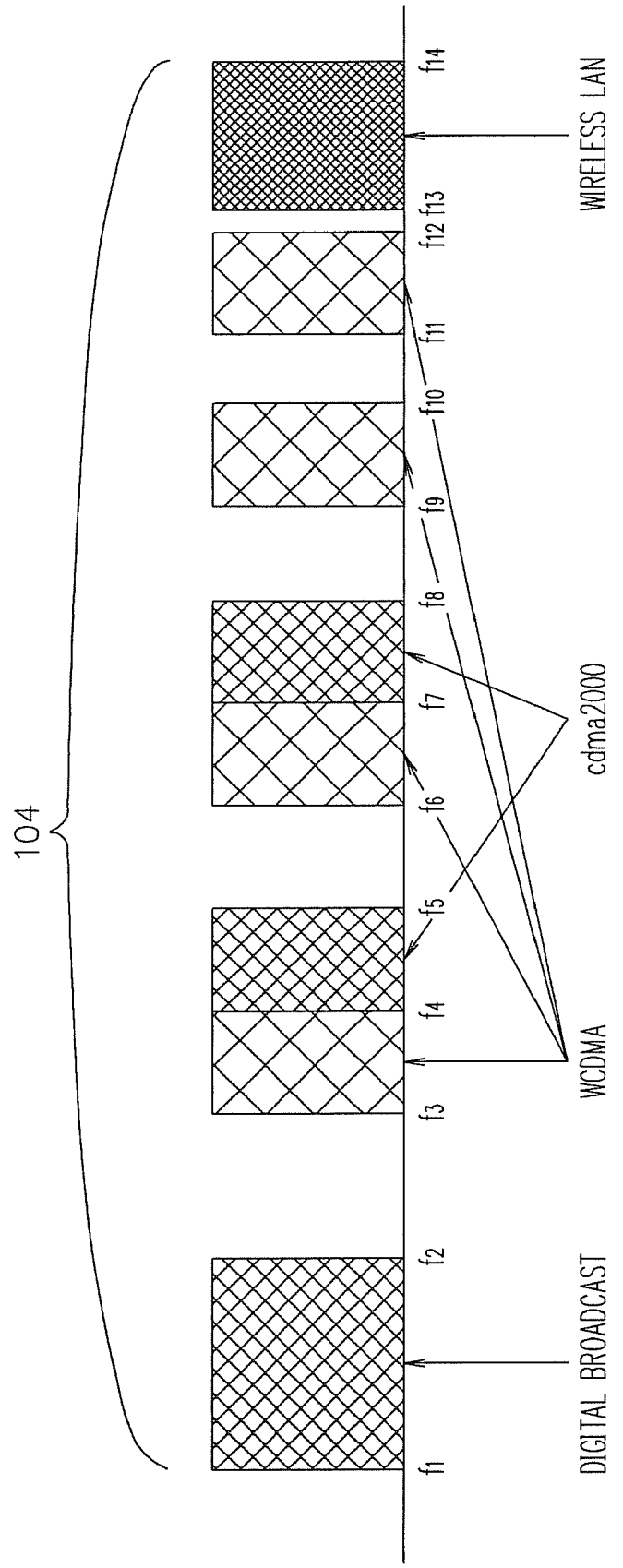
FIG. 4 is an explanatory diagram showing an example of allocation of frequencies of radio wave information sent from a radio wave tower.
Figure 5:
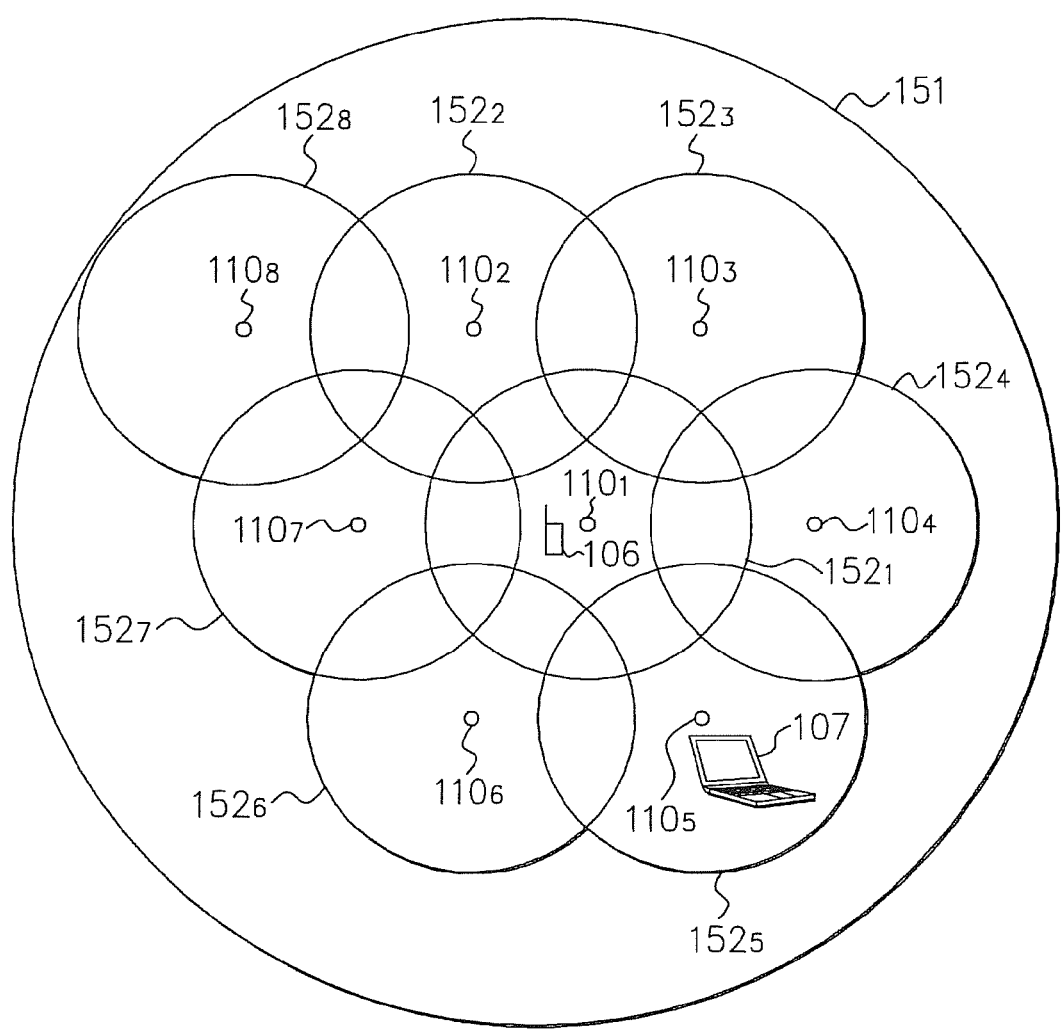
FIG. 5 is an explanatory diagram showing service areas respectively of the communication and the television broadcast by the portable terminal in the embodiment.
Figure 6:
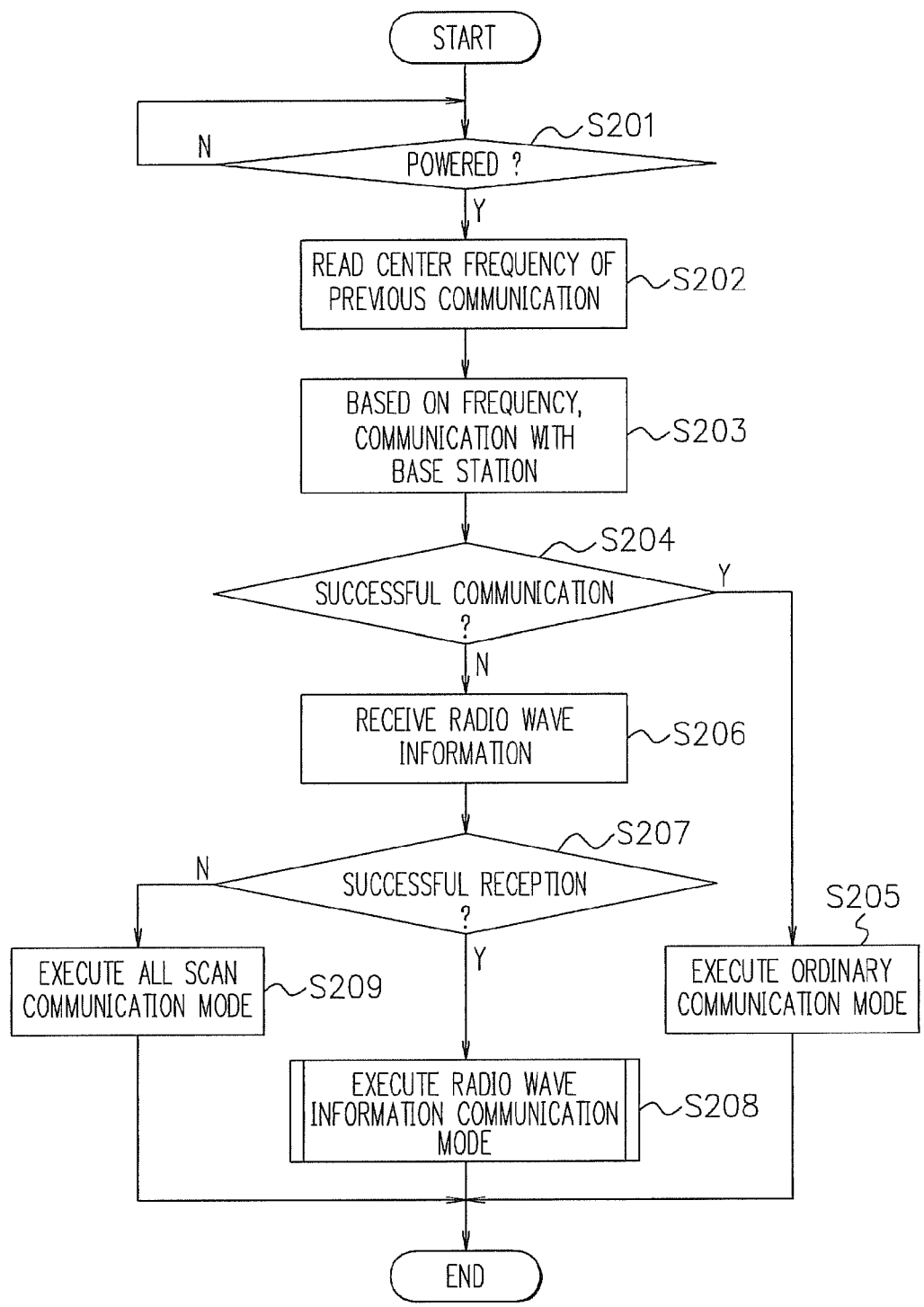
FIG. 6 is a flowchart showing an outline of control of the portable terminal from when the terminal is powered to when the communication is conducted in the embodiment.
Figure 8:
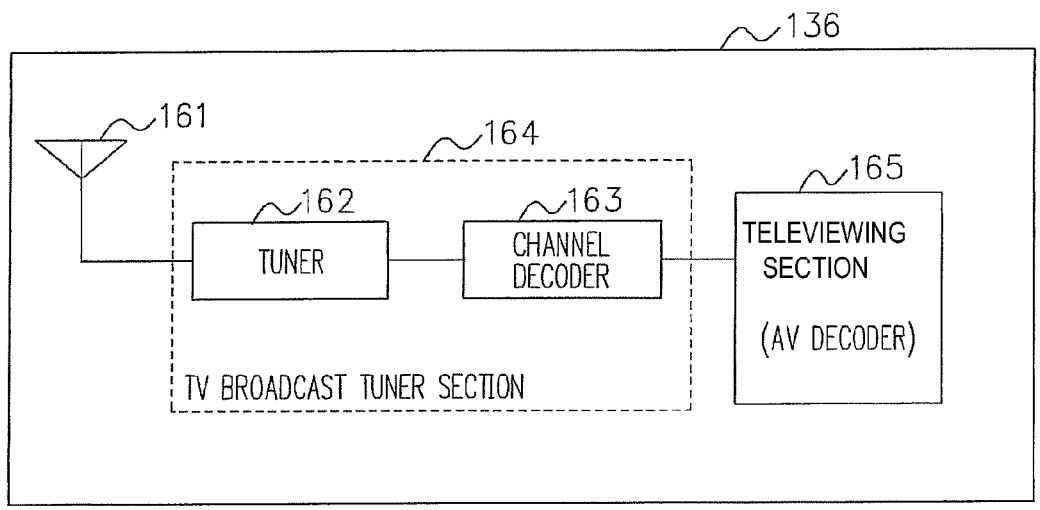
FIG. 8 is a block diagram showing an outline of the television receiving section shown in FIG. 3.
Figure 9:
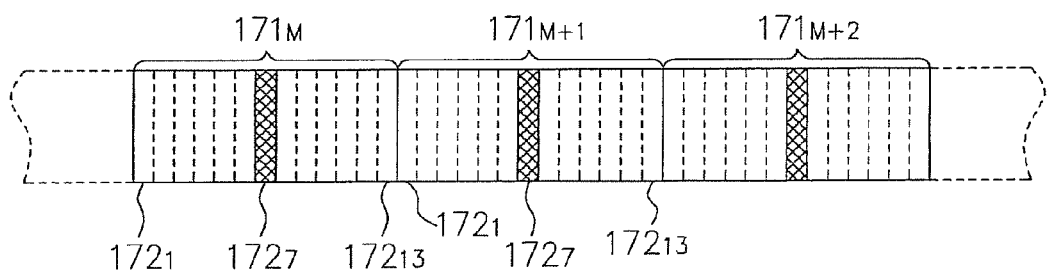
FIG. 9 is an explanatory diagram showing a relationship between respective broadcast channels and segments in the terrestrial digital broadcast of the one-segment scheme.
Figure 10:
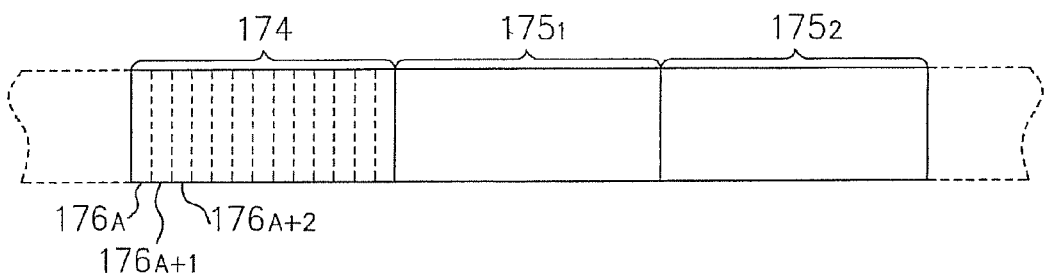
FIG. 10 is an explanatory diagram showing respective channels in the terrestrial digital broadcast of the DVB-H scheme.
Figure 11:
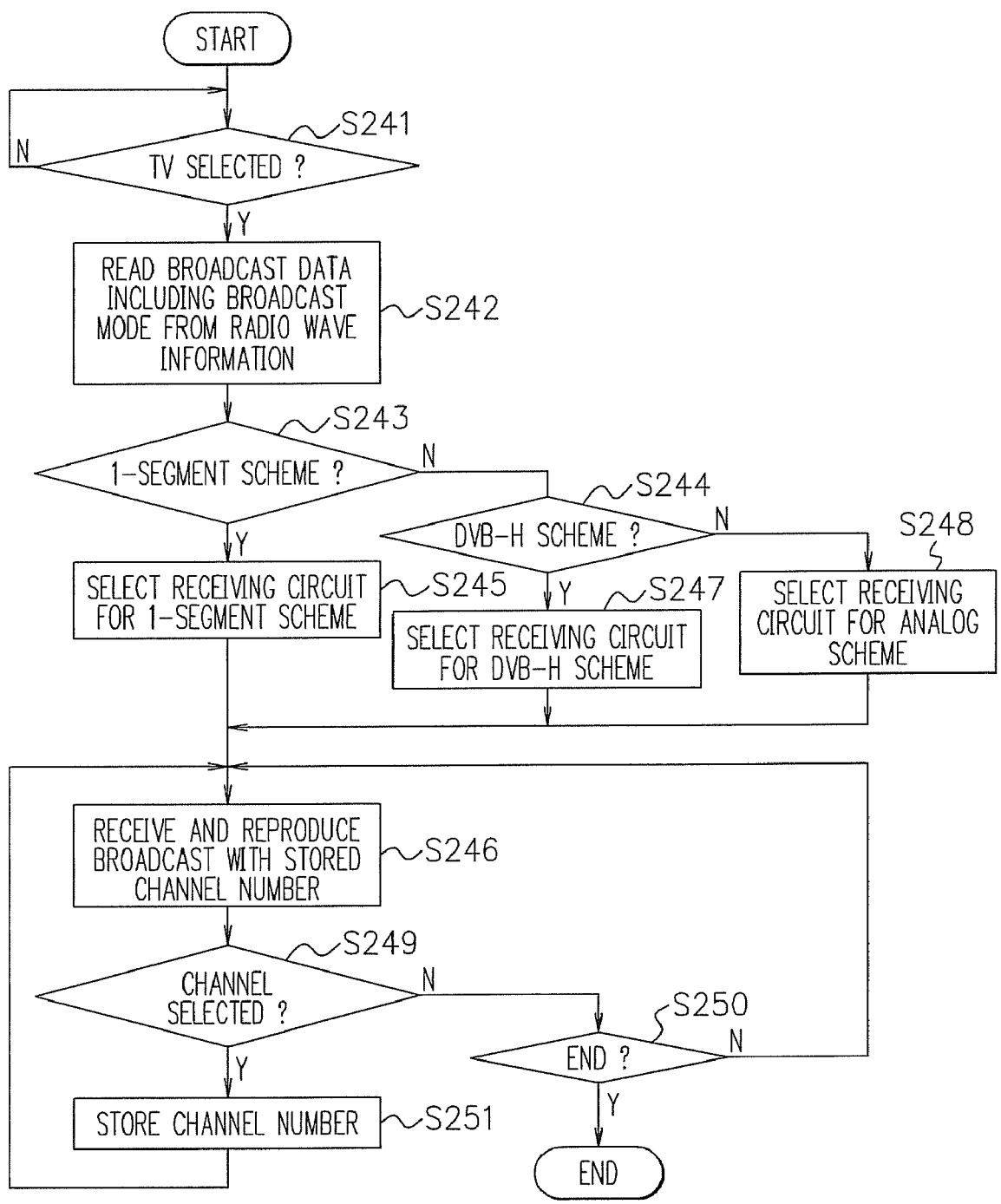
FIG. 11 is a flowchart showing a flow of processing when a television program is watched by use of the portable terminal of the embodiment.
Figure 12:
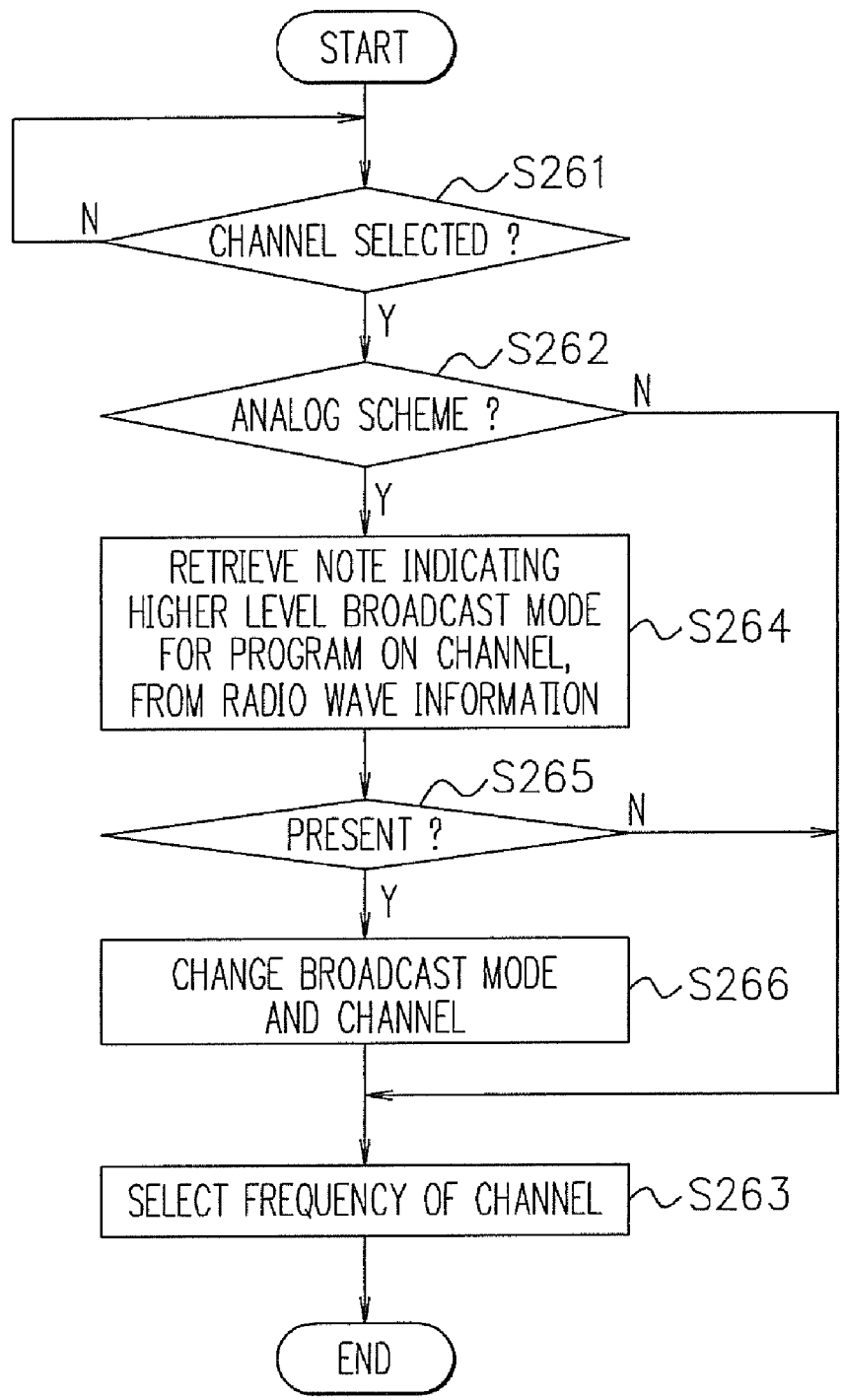
FIG. 12 is a flowchart showing processing to change the broadcast mode and the channel on the basis of note information as a first variation of the present invention.
Figure 13:
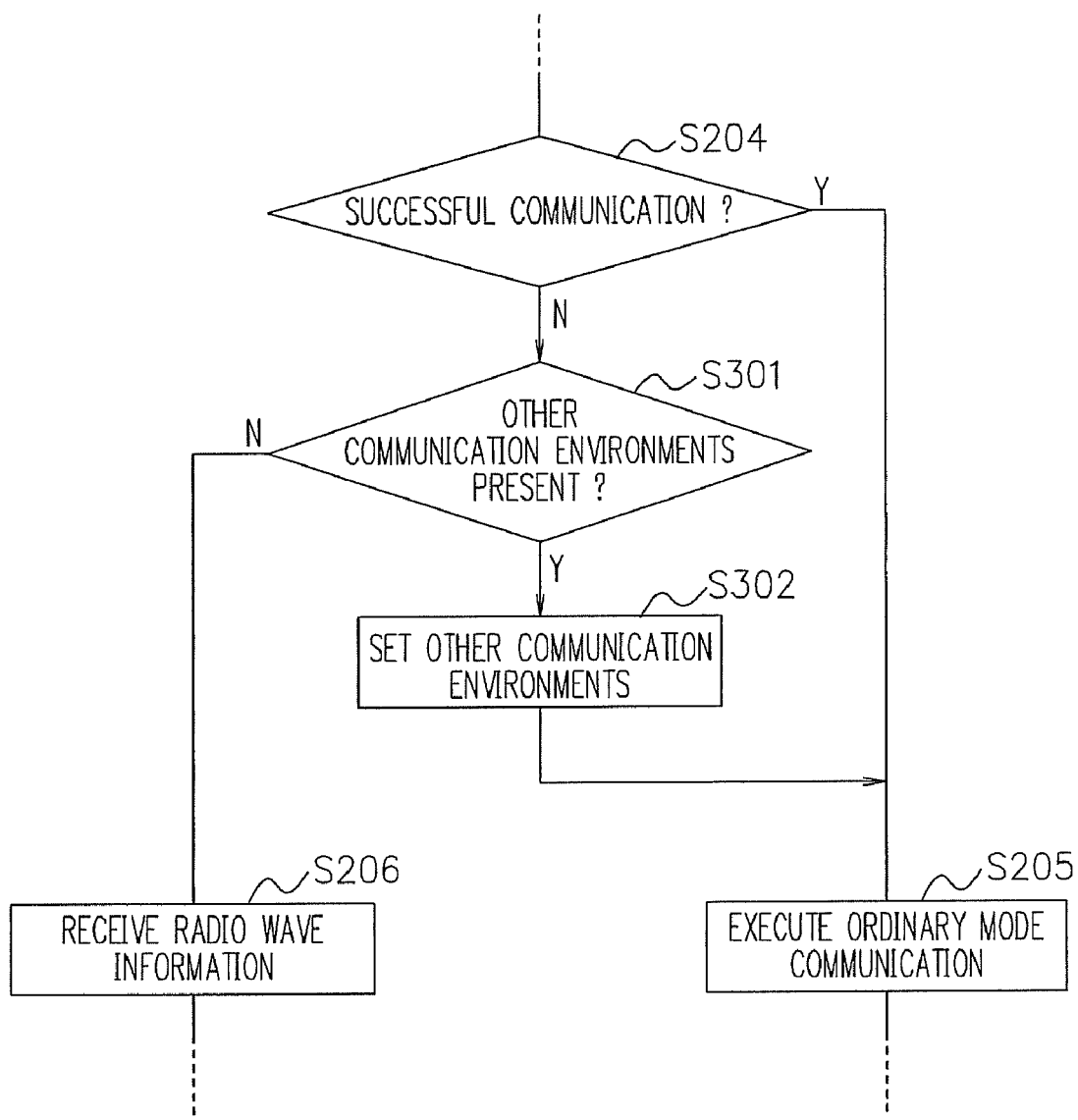
FIG. 13 is a flowchart showing a changed portion of the control processing of the portable terminal in a second variation of the present invention shown in FIG. 6.

100 Communication-broadcast system
101 Radio wave tower
102 Radio wave information transmitting apparatus
103 Broadcast transmitting apparatus
106 Portable terminal
107 Notebook personal computer
108 GPS satellite
110 Base station
112 Cellular communication network
121 CPU
122 ROM
123 RAM
126 Radio wave information receiving section
127 GPS receiving section
128 Cellular communication section
132 Display
135 Speaker
136 Television receiving section
164 Television broadcast tuner section
165 Televiewing section

The invention claimed is:

1. A transmitting apparatus used in each of geographically classified areas to which a communication service and a broadcasting service are provided for a portable terminal having a communication function and a broadcast receiving function belonging in the area, said transmitting apparatus comprising:

a radio wave information transmitting unit that constantly transmits radio wave information regarding frequency allocation to a radio wave type for the communication service and the broadcasting service that are used in an associated area in relation to positional information, by use of a radio wave having a predetermined particular frequency that is different in each area, wherein current positional information of the portable terminal is used to narrow down retrieval objects of the frequency allocation for the communication service when the retrieval objects are more than a predetermined quantity in number.

2. The transmitting apparatus in accordance with claim 1, characterized by comprising a television broadcast transmitting unit that transmits a radio wave of content of a television broadcast, wherein said radio wave information includes channel information and a broadcast mode of the television broadcast.

3. The transmitting apparatus in accordance with claim 1, characterized in that the radio wave information comprises, in addition to the frequency allocation, frame timing, a pilot code and a pilot frequency, and operator information in relation to positional information for determining a frequency for communication in association with a communication scheme.

4. The transmitting apparatus in accordance with claim 1, characterized in that the radio wave information further comprises note information indicating preferential selection for higher quality in a provided service for a user of the portable terminal.

5. A portable terminal used in each of geographically classified areas to which a communication service and a broadcasting service are provided and radio wave information regarding frequency allocation to a radio wave type for the communication service and the broadcasting service that is used in an associated area in relation to positional information is constantly transmitted by use of a radio wave having a predetermined particular frequency that is different in each area, comprising:

a radio wave information receiving unit that receives the radio wave by selecting a frequency corresponding to the associated area based on a list of the radio waves stored in a memory in advance, extracts from the received radio wave, the radio wave information regarding the frequency allocation to the radio wave type that are used in an associated area, and determines the frequency to be used in the associated area by use of the extracted radio wave information;

a position receiving unit that receives a positional signal and calculates a current position of the portable terminal;

a communication unit that sets a communication environment for communication by use of the extracted radio wave information and conducts communication; and a television receiving unit that includes a circuit part to receive a television signal, wherein the current position information calculated by the position receiving unit is used for narrowing down retrieval objects of the frequency allocation for the communication service when the retrieval objects are more than a predetermined quantity in number.

6. The portable in accordance with claim 5, wherein the radio wave information receiving unit extracts a list of frequencies corresponding a communication scheme of the terminal from a communication data area of the received radio wave information, and retrieves a frequency to be used for communication from the frequencies in the list.

7. The portable terminal in accordance with claim 6, characterized in that said radio wave information includes, in addition to the frequency allocation, frame timing, a pilot code and a pilot frequency, and operator information in relation to positional information,
wherein the radio wave information receiving unit determines the frequency for communication in association with the communication scheme.

8. The portable terminal in accordance with claim 5, characterized in that said radio wave information includes channel information and a broadcast mode of the television broadcast,
wherein the television receiving unit selects a broadcast receiving circuit for receiving the corresponding television signal.

9. A communication broadcast system, characterized by comprising:
a transmitting apparatus that constantly transmits, by use of a predetermined particular frequency in each of geographically classified areas, radio wave information regarding frequency allocation to a radio wave type including a communication system and a broadcasting system that are used in an associated area in relation to positional information; and
a portable terminal that receives a radio wave having a predetermined particular frequency by selecting a frequency corresponding to the associated area based on a list of the radio waves stored in a memory in advance, extracts from the received radio wave, the radio wave information regarding the frequency allocation to the radio wave type that is used in the associated area and determines the frequency to be used in the associated area by use of the extracted radio wave information,
wherein the portable terminal retrieves a required frequency for communication by narrowing down retrieval objects by use of current positional information of the portable terminal when the retrieval objects are more than a predetermined quantity in number.

10. The communication broadcast system in accordance with claim 9,
wherein the portable terminal extracts a list of frequencies corresponding to a communication scheme of the terminal from a communication data area of the received radio wave information, and retrieves a frequency to be used for communication from the frequencies in the list.

11. A communication method, characterized by comprising:
a transmitting step of constantly transmitting radio wave information, in each of geographically classified areas by a transmitting apparatus, regarding frequency allocation to a radio wave type including a communication system and a broadcasting system that are used in an associated area for a portable terminal in relation to positional information by use of a radio wave having a predetermined particular frequency that is different in each area;
a radio wave information receiving step, performed by the portable terminal, of receiving the radio wave by selecting a frequency corresponding to the associated area based on a list of the radio waves stored in the portable terminal in advance;
a radio wave information extracting step, performed by the portable terminal, of extracting from the received radio wave, the radio wave information regarding the frequency allocation to the radio wave type that is used in the associated area, and of determining the frequency to be used in the associated area by use of the extracted radio wave information;
a position receiving step, performed by the portable terminal, of receiving a positional signal and calculating a current position of the portable terminal; and
a communication conducting step, performed by the portable terminal, of setting a communication environment for communication by use of the extracted radio wave information and conducting communication,
wherein the current position information calculated in the position receiving step is used to narrow down retrieval objects of the frequency allocation for the communication service when the retrieval objects are more than a predetermined quantity in number.

12. The communication method in accordance with claim 11,
wherein the radio wave information extracting step includes a step of extracting a list of frequencies corresponding to a communication scheme of the portable terminal from a communication data area of the received radio wave information, and a step of retrieving a frequency to be used for communication from the frequencies in the list.

13. A non-transitory computer-readable recording medium having embodied thereon a computer program, which when executed by a computer, causes the computer to execute processing to realize a transmitting apparatus used in each of geographically classified areas to which a communication service and a broadcasting service are provided for a portable terminal having a communication function and a broadcast receiving function belonging in the area, the processing comprising:
radio wave information transmitting processing for constantly transmitting radio wave information regarding frequency allocation to a radio wave type for the communication service and the broadcasting service that are used in an associated area in relation to positional information, by use of a radio wave having a predetermined particular frequency that is different in each area,
wherein current positional information of the portable terminal is used to narrow down retrieval objects of the frequency allocation for the communication service when the retrieval objects are more than a predetermined quantity in number.

14. A non-transitory computer-readable recording medium having embodied thereon a computer program, which when executed by a computer, causes the computer to execute processing to realize a portable terminal used in each of geographically classified areas to which a communication service and a broadcasting service are provided and radio wave information regarding frequency allocation to a radio wave type for the communication service and the broadcasting service that are used in an associated area in relation to positional information is constantly transmitted by use of a radio wave having a predetermined particular frequency that is different in each area, the processing comprising:

radio wave information receiving processing for receiving the radio wave by selecting a frequency corresponding to the associated area based on a list of the radio waves stored in a memory in advance, and extracting from the received radio wave, the radio wave information regarding the frequency allocation to the radio wave type that is used in an associated area, and determines the frequency to be used in the associated area by use of the extracted radio wave information;

position receiving processing for receiving a positional signal and for calculating a current position of the portable terminal;

communication processing for setting a communication environment for communication by use of the extracted radio wave information and for conducting communication; and television receiving processing for receiving a television signal, wherein the current position information calculated in the position receiving processing is used to narrow down retrieval objects of the frequency allocation for the communication service when the retrieval objects are more than a predetermined quantity in number.

* * * * *